US009237324B2

(12) United States Patent
Lee et al.

(10) Patent No.: US 9,237,324 B2
(45) Date of Patent: Jan. 12, 2016

(54) PLAYBACK SYNCHRONIZATION

(71) Applicant: DTS, INC., Calabasas, CA (US)

(72) Inventors: Chunho Lee, La Cresenta, CA (US); Dannie Lau, Los Angeles, CA (US)

(73) Assignee: Phorus, Inc., Encino, CA (US)

( * ) Notice: Subject to any disclaimer, the term of this patent is extended or adjusted under 35 U.S.C. 154(b) by 272 days.

(21) Appl. No.: 14/025,658

(22) Filed: Sep. 12, 2013

(65) Prior Publication Data

US 2014/0010515 A1 Jan. 9, 2014

Related U.S. Application Data

(63) Continuation-in-part of application No. 13/278,799, filed on Oct. 21, 2011, now abandoned.

(60) Provisional application No. 61/701,326, filed on Sep. 14, 2012, provisional application No. 61/405,835, filed on Oct. 22, 2010.

(51) Int. Cl.
*H04J 3/06* (2006.01)
*H04N 9/89* (2006.01)
*H04L 29/06* (2006.01)
(Continued)

(52) U.S. Cl.
CPC .............. *H04N 9/89* (2013.01); *H04L 12/282* (2013.01); *H04L 12/2807* (2013.01); *H04L 65/4076* (2013.01); *H04L 65/605* (2013.01); *H04L 65/80* (2013.01); *H04N 21/4305* (2013.01); *H04N 21/4307* (2013.01); *H04N 21/43615* (2013.01); *H04N 21/43637* (2013.01); *H04N 21/443* (2013.01); *H04N 21/44227* (2013.01);
(Continued)

(58) Field of Classification Search
CPC ............... H04N 9/89; H04N 21/4307; H04N 21/43637; H04N 21/4427; H04N 21/443; H04N 21/4516; H04N 21/485; H04N 21/4305; H04N 21/43615; H04L 65/605; H04L 65/4076; H04L 12/2807; H04L 12/282; H04L 65/80; H04L 2012/2841
See application file for complete search history.

(56) References Cited

U.S. PATENT DOCUMENTS 7,031,306 B2    4/2006  Amaral et al.
7,185,219 B1 *  2/2007  Bachmeier et al. ........... 713/503
(Continued)

OTHER PUBLICATIONS

International Search Report and The Written Opinion of the International Searching Authority in the corresponding PCT Application No. PCT/US2013/059539; filed Sep. 12, 2013.

(Continued)

*Primary Examiner* — Robert Wilson
(74) *Attorney, Agent, or Firm* — Blake Welcher; William Johnson; Craig Fischer

(57) ABSTRACT

Various exemplary embodiments relate to method and media devices for synchronizing media playback between a receiving media device and sending media device, including: receiving, at the receiving media device, a plurality of messages from the sending media device, wherein the plurality of messages include a plurality of sender timestamps; generating a plurality of clock offset values based on the plurality of sender timestamps and a clock of the receiving media device; identifying a minimum clock offset value from the plurality of clock offset values; locating first media data for playback and a first presentation time associated with the first media data; and causing the first media data to be rendered at a first time that matches the first presentation time based on the minimum clock offset.

12 Claims, 8 Drawing Sheets

(51) Int. Cl.
  *H04L 12/28*   (2006.01)
  *H04N 21/43*   (2011.01)
  *H04N 21/4363*  (2011.01)
  *H04N 21/442*   (2011.01)
  *H04N 21/443*   (2011.01)
  *H04N 21/45*   (2011.01)
  *H04N 21/485*   (2011.01)
  *H04N 21/436*   (2011.01)

(52) U.S. Cl.
  CPC ......... *H04N21/4516* (2013.01); *H04N 21/485* (2013.01); *H04L 2012/2841* (2013.01)

(56) References Cited

U.S. PATENT DOCUMENTS

| | | |
|---|---|---|
| 7,266,713 B2 | 9/2007 | Lienhart et al. |
| 7,631,119 B2 | 12/2009 | Moore et al. |
| 7,672,465 B2 | 3/2010 | Iwamura |
| 7,680,153 B2 | 3/2010 | Ma |
| 7,805,210 B2 | 9/2010 | Cucos et al. |
| 7,925,776 B2 | 4/2011 | Okada |
| 8,037,220 B2 | 10/2011 | Moore et al. |
| 8,102,836 B2 | 1/2012 | Jerlhagen et al. |
| 8,185,674 B2 | 5/2012 | Moore et al. |
| 8,837,530 B2* | 9/2014 | Agrawala et al. ............. 370/507 |
| 2006/0239655 A1* | 10/2006 | Ogura et al. .................. 386/111 |
| 2007/0021069 A1 | 1/2007 | Abramov et al. |
| 2007/0180137 A1 | 8/2007 | Rajapakse |
| 2008/0253736 A1 | 10/2008 | Wilcox et al. |
| 2008/0291863 A1 | 11/2008 | Agren |
| 2009/0192638 A1 | 7/2009 | Van Leest et al. |
| 2009/0245548 A1 | 10/2009 | Yoon et al. |
| 2010/0023638 A1 | 1/2010 | Bowman |
| 2010/0034103 A1* | 2/2010 | Froehlich et al. ............. 370/252 |
| 2010/0142723 A1 | 6/2010 | Bucklen |
| 2010/0172512 A1 | 7/2010 | Braithwaite et al. |
| 2010/0303046 A1 | 12/2010 | Braithwaite et al. |
| 2011/0002429 A1 | 1/2011 | Williams et al. |
| 2011/0051637 A1* | 3/2011 | Wise et al. .................... 370/310 |
| 2011/0150228 A1 | 6/2011 | Yoon et al. |
| 2011/0185389 A1 | 7/2011 | Braithwaite et al. |
| 2011/0276648 A1* | 11/2011 | Soldan .......................... 709/208 |
| 2011/0289545 A1 | 11/2011 | Eguchi et al. |
| 2012/0060046 A1 | 3/2012 | Millington |
| 2012/0099594 A1 | 4/2012 | Lau et al. |
| 2014/0010515 A1* | 1/2014 | Lee et al. ...................... 386/207 |
| 2015/0215715 A1* | 7/2015 | Sheen ........................... 370/389 |

OTHER PUBLICATIONS

Tom Blank, Bob Atkinson, Michael Isard, James D. Johnston, and Kirk Olynyk, an Internet Protocol (IP) Sound System, Audio Engineering Society Convention Paper, Presented at the 117th Convention on Oct. 28-31, 2004 San Franciso, California, U.S.A. pp. 1-17.
International Preliminary Report on Patentability, mailed Aug. 20, 2014, in related PCT Application No. PCT/US13/59539, filed Sep. 12, 2013.

* cited by examiner

PLAYBACK SYNCHRONIZATION

CROSS-REFERENCE TO RELATED APPLICATIONS

This application claims the benefit of U.S. Provisional Application No. 61/701,326, entitled "Playback Synchronization," to Lee et al., filed on Sep. 14, 2012, the entire disclosure of which is hereby incorporated herein by reference for all purposes as if fully set forth herein. This application is a continuation-in-part of U.S. application Ser. No. 13/278,799, entitled "Media Distribution Architecture," to Lau et al., filed on Oct. 21, 2011, which claims the benefit of U.S. Provisional Application No. 61/405,835, entitled "Media Distribution Architecture," to Lau et al., filed on Oct. 22, 2010, the entire disclosures of which are hereby incorporated herein by reference for all purposes as if fully set forth herein.

TECHNICAL FIELD

Various exemplary embodiments disclosed herein relate generally to media streaming and networked media playback.

BACKGROUND

As electronic devices such as smart phones and tablet become more prevalent, people are more frequently using such devices to play content such as music and videos. Often, these media sources may not tender media to the full satisfaction of the user. For example, the display may be too small or the speaker volume may be of insufficient quality or volume. Moreover, output from the media source may not be easily or comfortably enjoyed by multiple people. Furthermore, absent carrying the media source with them, the user is unable to enjoy the media in various locations throughout their home.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments described herein relate to a method of synchronizing media playback between a sending media device and a receiving media device, the method including: receiving, at the receiving media device, a plurality of messages from the sending media device, wherein the plurality of messages include a plurality of sender timestamps; generating a plurality of clock offset values based on the plurality of sender timestamps and a clock of the receiving media device; identifying a minimum clock offset value from the plurality of clock offset values; locating first media data for playback and a first presentation time associated with the first media data; and causing the first media data to be rendered at a first time that matches the first presentation time based on the minimum clock offset.

Various embodiments described herein relate to a receiving media device for synchronizing media playback with a sending media device, the receiving media device including: a memory configured to store media data for playback; a network interface configured to communicate with the sending media device; and a processor configured to: receive, via the network interface, a plurality of messages from the sending media device, wherein the plurality of messages include a plurality of sender timestamps; generate a plurality of clock offset values based on the plurality of sender timestamps and a clock of the receiving media device; identify a minimum clock offset value from the plurality of clock offset values; locate first media data for playback and a first presentation time associated with the first media data; and cause the first media data to be rendered at a first time that matches the first presentation time based on the minimum clock offset value.

Various embodiments described herein relate to a non-transitory machine-readable storage medium encoded with instructions for execution by a receiving media device for synchronizing media playback between a sending media device and the receiving media device, the medium including: instructions for receiving, at the receiving media device, a plurality of messages from the sending media device, wherein the plurality of messages include a plurality of sender timestamps; instructions for generating a plurality of clock offset values based on the plurality of sender timestamps and a clock of the receiving media device; instructions for identifying a minimum clock offset value from the plurality of clock offset values; instructions for locating first media data for playback and a first presentation time associated with the first media data; and instructions for causing the first media data to be rendered at a first time matches the first presentation time based on the minimum clock offset value.

Various embodiments additionally include obtaining a plurality of timestamps from a round-trip transit between the receiving media device and the sending media device; establishing a lower bound offset value based on the plurality of timestamps; and after identifying the minimum clock offset value, determining that the minimum clock offset value represents a better estimate of a true clock offset between a sending device clock and a receiving device clock than the lower bound offset value, wherein causing the first media data to be rendered at a first time that matches the first presentation time based on the minimum clock offset is performed based on determining that the minimum clock offset value represents a better estimate of a true clock offset between a sending device clock and a receiving device clock than the lower bound offset value.

Various embodiments are described wherein identifying a minimum clock offset value includes: generating a first clock offset value of the plurality of clock offset values; setting the minimum clock offset value equal to the first offset clock value; generating a second clock offset value of the plurality of clock offset values after setting the minimum clock offset value equal to the first offset clock value; determining that the second clock offset value is less than the minimum clock offset value; and setting the minimum clock offset value equal to the second offset clock value based on determining that the second clock offset value is less than the minimum clock offset value.

Various embodiments additionally include modifying the value of the clock of the receiving media device by subtracting the minimum offset value from the value of the clock, wherein the first time matching the first presentation time based on the minimum clock offset value includes the value of the clock matching the first presentation time.

Various embodiments additionally include receiving at the receiving media device, a message from the sending media device, wherein the message includes second media data, a second presentation time, and a sender timestamp; generating a clock offset value based on the sender timestamp; determining that the clock offset value is a more accurate representation than the minimum clock offset value of a true offset between the clock of the receiving media device and a clock of the sending media device; adjusting the minimum clock offset value based on the clock offset value; locating third media data for playback and a third presentation time associated with the third media data; causing the third media data to be rendered at a second time that matches the third presentation time based on the minimum clock offset value after adjusting the minimum clock offset value.

Various embodiments are described wherein: determining that the clock offset value is a more accurate representation than the minimum clock offset value of a true offset between the clock of the receiving media device and a clock of the sending media device includes determining that the clock offset value is less than zero, and adjusting the minimum clock offset value based on the clock offset value includes modifying the value of the clock of the receiving media device by subtracting the offset value from the value of the clock.

Various embodiments additionally include converting at least one sender timestamp of the plurality of timestamps from a time domain of the sending media device to a time domain of the receiving media device, wherein generating a plurality of clock offset values based on the plurality of sender timestamps and a clock of the receiving media device includes generating at least one clock offset value based on the at least one sender timestamp after converting the at least one sender timestamp of the plurality of timestamps from the time domain of the sending media device to the time domain of the receiving media device.

Various embodiments are described wherein the plurality of messages includes a first plurality of messages and a second plurality of messages, the method further including: generating a first measure of the intervals at which the first plurality of messages arrive; determining that the first measure of the intervals at which the first plurality of messages arrive indicates that a network is unstable; instructing the sending media device to transmit additional messages; generating a second measure of the intervals at which the second plurality of messages arrive after instructing the sending media device to transmit additional messages; determining that the second measure of the intervals at which the second plurality of messages arrive indicates that the network is stable, wherein identifying a minimum clock offset value from the plurality of clock offset values includes utilizing at least one clock offset value of the plurality of clock offset values associated with the second plurality of messages.

Various embodiments are described wherein the plurality of messages includes a first plurality of messages and a second plurality of messages, the method further including: transmitting, by the sending media device, the first plurality of messages, generating, by the sending media device, a first measure of network performance associated with transmission of the first plurality of messages, determining that the first measure of network performance indicates that a network is unstable, transmitting, by the sending media device, the second plurality of messages based on determining that the first measure of network performance indicates that a network is unstable, generating, by the sending media device, a second measure of network performance associated with transmission of the second plurality of messages, and determining that the second measure of network performance indicates that the network is stable.

BRIEF DESCRIPTION OF THE DRAWINGS

In order to better understand various exemplary embodiments, reference is made to the accompanying drawings, wherein.

DETAILED DESCRIPTION

Figure 1:
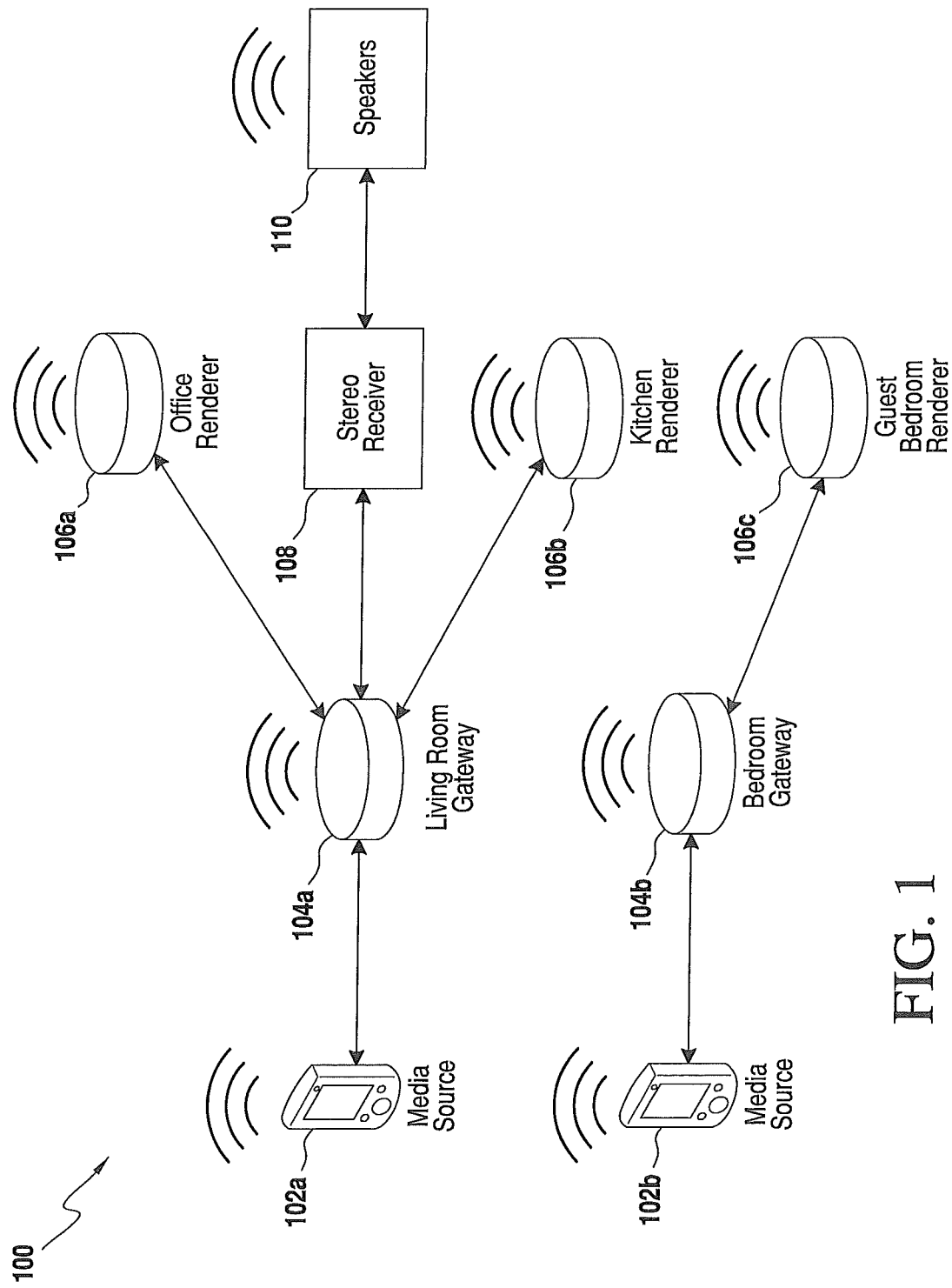
FIG. 1 illustrates an exemplary environment for media playback.

The description and drawings presented herein illustrate various principles. It will be appreciated that those skilled in the art will be able to devise various arrangements that, although not explicitly described or shown herein, embody these principles and are included within the scope of this disclosure. As used herein, the term, "or," as used herein, refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein.

Various embodiments described herein utilize an architecture for distributing media content. A wired or wireless media transport technology may be provided to allow for the simultaneous transmission of media to multiple zones while maintaining precise timing synchronization between various media devices. A user may have a network of speakers, displays, or other rendering devices and independently select which rendering devices are actively outputting media. Such rendering devices, along with other devices as will be described herein, may belong to a virtual media network.

Media rendered by a virtual media network may originate from a media source. The media source may be a cell phone, tablet, stereo, set-top box, PC or other device. The transmission method of media in the virtual media network may be wired, as through an auxiliary cable, or wireless, as with Bluetooth or WiFi. The speakers and other rendering devices themselves may be governed in a self-forming network. Media may be injected into the network by the media source and the end-point network itself may control audio/video distribution, timing, and rendering. In some embodiments, the audio that is injected into the network is the audio portion of an audio-video signal. The video signal may be played on the media source (e.g., tablet computer). The audio signal may be kept in sync with the video signal.

In various embodiments, a user may select any media application to serve as a source of the media. For example, the user may select an MP3 application, an Internet radio application, etc. The user may then select an output device, such as a speaker in their living room, to cause the media to be sent to the selected output device. The audio may be sent to the selected output device by the operating system. The user may call up a second application to add other speakers to the virtual media network, as well as to control volume of the speakers, etc. The second application never modifies the media in some embodiments. The devices in the network may handle the audio/video distribution, timing, and rendering. Therefore, the media source may not be burdened with such processing. Moreover, such an arrangement may allow the user to select whatever media application they like as the source of the media without the necessity of modification to the media application.

In various embodiments, media distributed through the virtual media network may be kept in sync. To achieve such playback synchronization, various media devices transmitting media data may include time stamps associated with frames of media data to indicate at what time the associated media should be rendered. To enable such a mechanism, the media devices may be provided with methods of accounting for differences between the internal clocks of the media devices. For example, two media devices may begin operation with varying clock values or the clock values may drift apart during operation due to the clocks running at slightly different speeds.

While some methods of networked clock synchronization have been developed in the past, such methods may only be reliable in wired networks wherein network delay is relatively constant and therefore easily accounted for as part of the rendering process. In wireless networks such as WiFi or Bluetooth, on the other hand, network delay may vary considerably over short time periods of time, thereby complicating the process of estimating the time a synchronization packet was sent. Various methods described herein implement a clock synchronization process that reduces or eliminates the effect of such variable delay on the process of networked clock synchronization. For example, by generating multiple potential clock offset values over a period of time, a receiving device is able to select the minimum offset value from the group and thereby utilize an offset value which has been influenced the least by the variable component of the network delay. Various additional features for improving networked clock synchronization will be described in greater detail below.

The following definitions will be used throughout this description:

Broadcaster—Any device capable of transmitting a media stream that is formatted for the virtual media network or a broadcasting mechanism within such a device.

Renderer—Any device that can tender a media stream that is formatted for the virtual media network or a rendering mechanism within such a device.

Media Node—Any device that contains a renderer or a broadcaster. Media nodes of some embodiments may be responsible for maintaining network time synchronization and the state of the network including media routing information.

Media source—Any device that transmits original media to a sink. May include virtually any type of hardware such as, for example, a cellular phone, a smart phone, a tablet, a set-top box, a television, a DVD/Blu-Ray/other media player, a stereo system, a video game console, a laptop, a desktop PC, a server, or any other device capable of transmitting media data.

Sink—Any device that receives originating media from a source or a mechanism within the device for receiving a media signal.

Gateway Capable Media Node—Any device that combines a sink and broadcaster. Gateways may accept media via a sink and re-broadcast the media into the virtual media network to renderers.

Virtual Media Network—A group of one or more nodes having at least one gateway. A virtual media network may be established by a user and may render a media signal that is synchronized between the rendering devices in the network. Note that, in some embodiments, only one media node serves as an active gateway of a virtual media network.

Media device—Any device that operates in conjunction with a virtual media network such as, for example, a media node or a media source.

Referring now to the drawings, in which like numerals refer to like components or steps, there are disclosed broad aspects of various exemplary embodiments.

FIG. 1 illustrates an exemplary environment 100 for media playback. There are a total of five network media nodes 104a-b, 106a-c in this example; various exemplary embodiments may include fewer or additional media nodes (not shown). The exemplary environment 100 is shown as being arranged into two virtual media networks. As shown, media source 102a serves as a source for a media signal for one virtual media network while media source 102b serves as a media source for another virtual media network, although other arrangements are possible. The media signal may be audio or video. In various embodiments, the media signal is the audio portion of an audio-video signal. The video signal may be played on the media source 102a,b. Note that in the exemplary embodiment, the audio signal is kept in sync with the video signal as the various signals are rendered by different devices. Also note that the video signal may be sent to one of the devices in the virtual media network, or some device other than the media source node 102a,b. In various embodiments, each virtual media network includes one gateway device while, in other embodiments, a virtual media network utilizes multiple gateway devices. As noted above, a gateway device has a sink for receiving a media signal and a broadcaster. A gateway device may or may not have a renderer for rendering audio and/or video. In the illustrated example, a device in the living room serves as a gateway for a first virtual media network; however, a different device having a broadcaster may act as the gateway.

In some embodiments, the system allows for simultaneous transmission of media to multiple zones while maintaining precise timing synchronization. As one example, a user may configure a network of speakers, independently select which ones are actively playing, and have their playback synchronized. The transmission method of media into the network can be wired, as through an auxiliary cable, or wireless as with Bluetooth, WiFi, or another network communication protocol. As one example, the living room gateway 104a has an auxiliary out line to provide the media signal to the stereo receiver 108 and, consequently, the speakers 110 attached thereto by one of its auxiliary lines. On the other hand, the living room gateway 104a may provide the media signal to the office renderer 106a and the kitchen renderer 106b via wireless transmission. Additionally, the living room gateway 104a may or may not have its own renderer. In some embodiments, the various media nodes belonging to a network are provided with and render different channels of a media stream. For example, a media source may render a video signal, a first renderer may render a left speaker channel of a stereo mix audio signal, a second renderer may render a right speaker channel of a stereo mix audio signal, a gateway may render the video signal and both channels of the stereo mix audio signal. Various other channel schemas and distributions of such channels among media devices will be apparent.

The media nodes 104a-b, 106a-c themselves are governed in a self-forming network in some embodiments. The media nodes 104a-b, 106a-c themselves may control audio/video distribution, timing, and rendering. Therefore, much of the processing load may be removed from the media source 102. The example of FIG. 1 pertains to a home environment, but embodiments are not so limited. Virtual media networks may be deployed in any environment.

Figure 2:
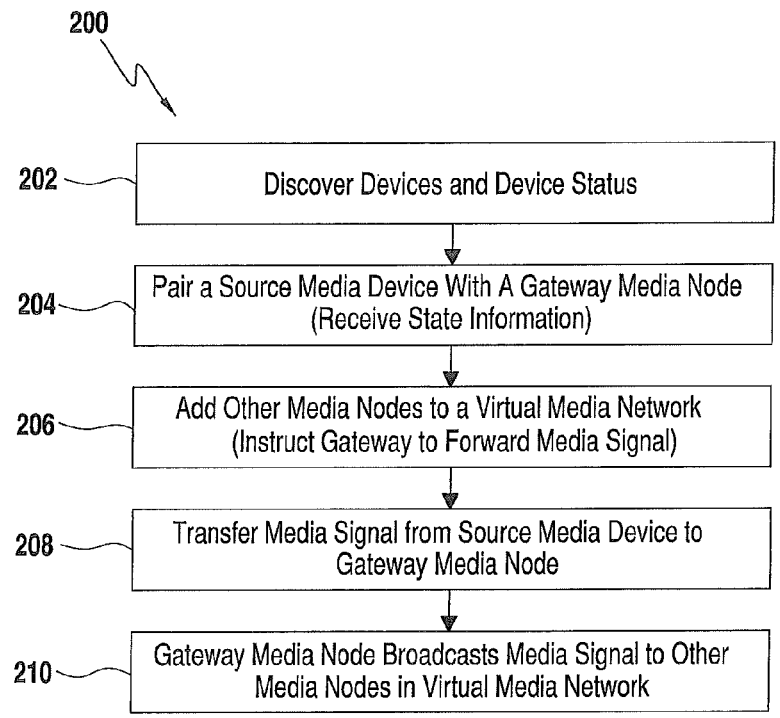
FIG. 2 illustrates an exemplary method for forming and operating a virtual media network.

FIG. 2 illustrates an exemplary method 200 for forming and operating a virtual media network. In step 202, media devices discover each other and exchange device status information. Step 202 may occur, for example, when media nodes 104, 106 are powered on. Since media nodes 104, 106 may be powered on at different times from each other, this step may be continually executed, repeater, or otherwise ongoing. In some embodiments, the media nodes 104, 106 perform a "self-discovery" protocol in which the media nodes 104, 106 learn of each other's existence and capabilities such as, for example, the ability to act as a source, sink, broadcaster, or renderer. The exchanged device status information may also include information such as, for example, whether the device is currently active in a virtual media network, the identity of such a virtual media network, whether the device is currently acting as a gateway, etc.

In step 204, a media source 102 is paired with a gateway media node 104. A user may specifically select one media node 104, which will serve as the gateway, or the gateway may be determined automatically without user intervention. For example, the user of smart phone 102a may select the living room media node 104a as a primary listening device, which results in it becoming the gateway. In some embodiments, the gateway media node 104 is selected based on its status as a currently active output device for the media source node 102. In some embodiments, the gateway media node 104 serves as an active output device for the media source node 102 while acting as the gateway and, as such, renders at least some channels of the media data. In some embodiments, the gateway media node 104 reports the device or state information to the media source 102.

In step 206, a virtual media network is formed. Step 206 may be formed in response to a user selecting media nodes 104, 106. For example, the user may access a software program on media source 102 that allows the user to select media nodes 104, 106. Note that if a media node 104, 106 is already a part of a different virtual media network, this media node 104, 106 might be indicated via the media source 102 as unavailable. Additionally or alternatively, the user may be able to request that an in-use media node 104, 106 be freed up for inclusion in the current virtual media network. In various embodiments, step 206 results in instructing the gateway media node 104 to forward the media signal to other media nodes 104, 106 in the virtual media network.

In step 208, media may be transferred from the media source 102 to the gateway media node 104. This step 208 could be initiated in response to a user selecting that media be presented on an output device associated with the media source. For example, the user could have any application running on the smart phone 102a that plays media. The user may then select the gateway media node 104 as an output device and the media may be transferred to the gateway media node 104. Note that this media transfer could happen at the operating system (OS) level. An implication of this transfer is that any media application may be selected by the user as the media source for the virtual media network.

In step 210, the gateway media node 104 may broadcast the media signal to other media nodes 104, 106 in the virtual media network. For example, the living room gateway 104a may broadcast the media signal it received from smart phone 102a to the office renderer 106a, the kitchen renderer 106b, and the stereo receiver 108. In some embodiments, each media node 104, 106 plays the media at its own user-controllable level (e.g., volume). Thus, there may be some commands sent from the media source 102 to the gateway media node 104. However, the gateway may perform much of the processing. Therefore, the media source 102 is not bogged down with a heavy processing load.

Figure 3:
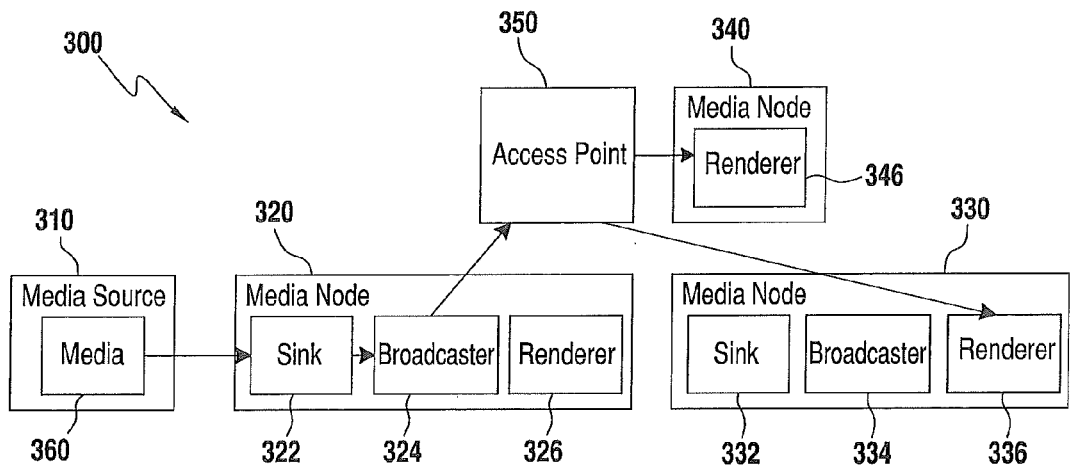
FIG. 3 illustrates an exemplary virtual media network.

FIG. 3 illustrates an exemplary virtual media network 300. As shown, there are two media nodes 320, 330 that are capable of serving as a gateway because they have sinks 322, 332 for receiving a media signal and broadcasters 324, 334 for providing the media signal to another media node 320, 330, 340. For the sake of illustration, there is an access point 350 that is separate from the media nodes 320, 330, 340. Note that one of the media nodes 320, 330, 340 may act as an access point.

Some of the media nodes 320, 330 include a broadcaster 324, 334. Such nodes may be referred to herein as broadcasting nodes. A broadcaster 324, 334 may be implemented by any combination of hardware or software. In various embodiments, broadcasters 324, 334 transmit media in an airtime broadcast format that is understood by other media nodes 320, 330, 340. Note that this format may be different from the one used to send the media 360 from the media source 310. Broadcasters 324, 334 and renderers 326, 336 may co-exist in the same media node 320, 330 so that local playback can be synchronized with playback on remote renderers. Source injection may be done via a source-sink link. Unlike source to sink transmission, airtime broadcasts can be used for point-to-multipoint media transmission with synchronous playback.

As noted, a gateway capable media node 320, 330 has the combination of a sink 322, 332 and a broadcaster 324, 336. In some embodiments, gateways 320, 330 receive media from the media source 310 and re-broadcast the media in a format that is compatible with other media nodes 320, 330, 340 in virtual media network. Gateways 320, 330 also include renderers 326, 336. In various embodiments, a gateway media node 320, 330 is considered to be an endpoint.

Multiple gateway capable media nodes 320, 330 can exist on the network. In some embodiments, the gateway media nodes 320, 330 utilize an election method to determine the best gateway for a media source 310 to use. For example, in the event only one media node 320, 330 with a renderer 326, 336 is active for the media source 310, that rendering node may also be the best gateway, conserving network bandwidth for other sources. On the other hand, if multiple renderers are active for the media source 310 the best gateway may be the one with the strongest or best network connection. An election scheme may occur to identify the best candidate and, if necessary, a stream handoff may occur to a different gateway 320, 330 in which case the original gateway 320, 330 may become the source's 310 sink. This may occur during stream construction or mid-stream. In the event that an active gateway is disabled, the network can self-heal and elect a new gateway to re-establish airtime broadcast streams.

Some of the media nodes 320, 330, 340 include a renderer 326, 336, 346. Such media nodes 320, 330, 340 may be referred to herein as tendering nodes. A renderer 326, 336, 346 may be implemented by any combination of hardware or software. Renderers 326, 336, 346 may decode and play the media stream through an internally powered speaker, or via analog or digital outputs to another amplifier/speaker device, using the example of audio for the media signal. For video, the renderer 326, 336, 346 may decode and play the media stream through an internally powered display, or via analog or digital outputs to another display or device having or driving a display. In various embodiments, a media node 320, 330, 340 with a renderer 326, 336, 346 supports the creation, maintenance, and distribution of a virtual wall clock. The renderers 326, 336, 346 may use the wall clock to precisely render the stream at the timestamp specified in the airtime stream format.

In the example of FIG. 3, there is a connection between a media source 310 to a sink 322 in the gateway media node 320. The media 360 is played by the renderer 326 in gateway media node 320. To establish the connection, the user may have selected gateway media node 320 as an output device for the media source 310. For example, the media source 310 may be a cellular telephone that allows the user to select which speaker to send audio to. Any audio that is being played by the cellular telephone may be sent to the selected speaker. Thus, regardless of what application is providing the audio (e.g., Internet radio, MP3, etc.), the audio may be routed to gateway media node 320. Note that no changes may need to be made to the application that provides the audio for this to happen. The connection between the media source 310 and gateway media node 320 could be wireless or wired. In various embodiments, it is a wireless Bluetooth connection. However, a wireless protocol other than Bluetooth may be used.

In addition to the connection between media source 310 and sink 322 in the gateway media node 320, the broadcaster 324 in media node 320 is used to send the media 360 to the renderer 336 in media node 330 and the renderer 346 in media node 340. In this example, the access point 350 selves as an intermediary. However, an access point 350 may not be a requirement. In various embodiments, media node 320 serves as the access point. The connections from the media source 310 to media node 330 and media node 340 may have been established in a similar manner to the connection between media source 310 and media node 320. The user may also have established media nodes 330, 340 as part of the virtual media network 300. The media source 310 may have a software application that allows the user to select which media nodes 320, 330, 340 to add to the virtual network. This application may send commands to media node 320 that instructs it to forward the media signal to the other media nodes 330, 340 that are an active part of the virtual media network. Media node 320 may handle details of reformatting the media signal, routing, synchronizing playback between media nodes, etc. Therefore, the media source 310 is not burdened with heavy processing.

It will be understood that virtual media network 300 is but one possible arrangement of one possible set of devices. Various alternative media networks 300 may include fewer or additional devices and may distribute media in a different manner. For example, the media source 310 may transmit media directly to the access point, media node 330 may serve as the gateway instead of media node 320, and media node 340 may not participate in the virtual network. Various alternative arrangements will be apparent.

As previously noted, media sources 310 may inject media 360 into the virtual media network 300. Examples include a PC or a smart phone. Available methods of media injection may include cables supporting analog or digital transmission, Bluetooth, and WiFi. In some embodiments, the media source 310 is a broadcaster, transmitting media data in a format that is compatible with the virtual media network. In other embodiments, technical limitations limit the ability of a media source 310 to broadcast. For example, the security model of many phones may prevent audio drivers from being modified by third parties. Also, the media source 310 device itself may not have available processing or network bandwidth. Further, in some embodiments, the QoS level for the media source's initial link utilize a higher QoS than other endpoints so that at least one endpoint may render to the highest possible fidelity.

Note that many formats and connections may be used for the transmission from media source 310 to sink 322. A media source 310 may transmit via wire, BT A2DP, or a specific protocol via Wi-Fi to a sink 322, as some non-limiting examples. A WiFi protocol may be designed to give a tradeoff between quality and latency, or to guarantee accuracy. For example, the protocol may detect errors and request retransmission of data. Often this may not be the goal of the broadcast; however, it is important that the media arrives reliably prior to broadcasting. Embodiments disclosed herein maintain compatibility with existing devices.

The network is based on standard Wi-Fi infrastructure in various embodiments. Each media node can connect to an access point 350 where it acquires an IP address via DHCP. Some nodes 310, 320, 330 may not have a UI (display, keyboard entry, etc.) that allows for the entering of a wireless access key. In such cases, WPS-PBC can be used to achieve a connection. Other methods can include ad-hoc mode, whereby the user connects to the endpoint directly from a GUI enabled device and inputs network parameters via a webpage served by the node, or an application page that communicates directly with the node. Another method is for an application running on a phone or other device to communicate with the media node via Bluetooth. An application can prompt the user for which access point to connect to and the corresponding network access code. In some embodiments, the media node 320, 330, 340 is provided with a name by the user during this set-up phase.

In the absence of infrastructure such as access points 350, a node may turn itself into a virtual access point. Other nodes may discover the access point 350 and connect to form a private network. WPS-PBC and ad-hoc methods may be used to make secure connections.

Figure 4:
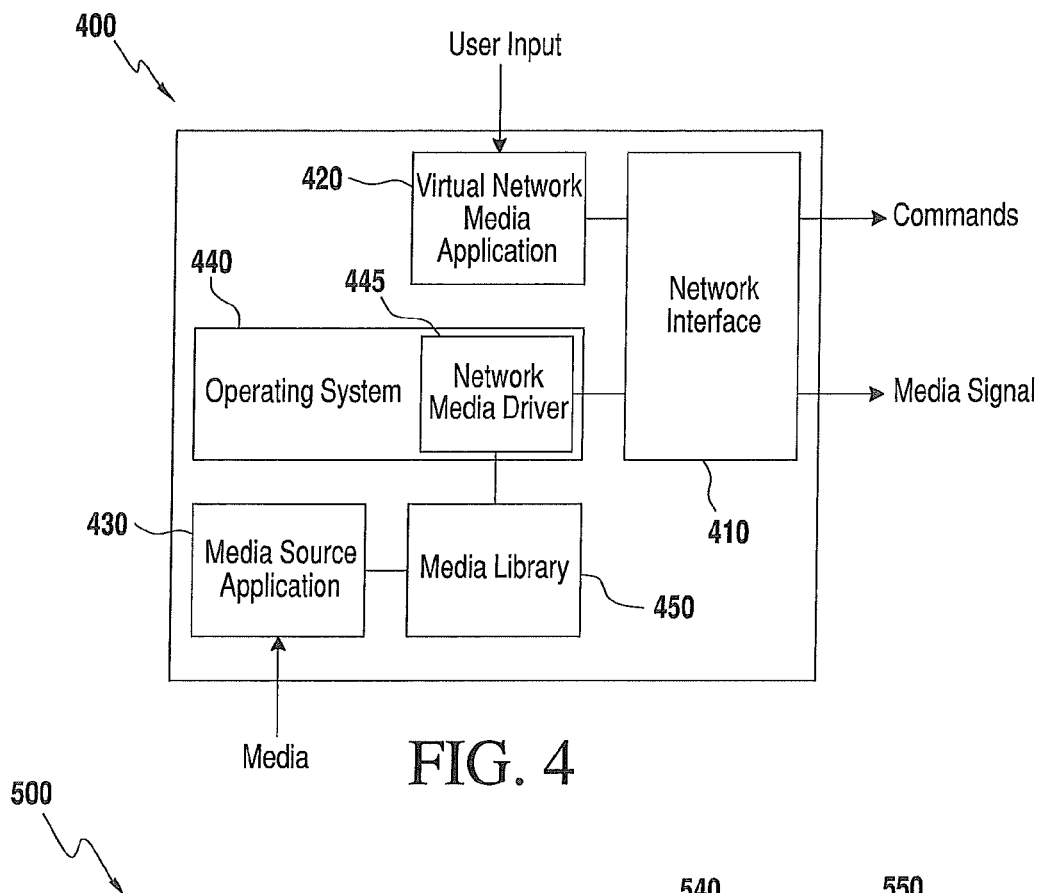
FIG. 4 illustrates an exemplary component diagram of a media source.

FIG. 4 illustrates an exemplary component diagram of a media source 400. The media source 400 may correspond to either of the media sources 102a,b of the exemplary environment 100 or media source 310 of the exemplary virtual media network 300. The media source 400 may include a network interface 410. In various embodiments, the network interface 410 includes multiple distinct interfaces. For example, the network interface 410 may include a Wi-Fi compliant interface and a Bluetooth compliant interface. Additionally or alternatively, the network interface 410 may include interfaces that are compliant with any other protocols. In this example, the media signal (e.g., audio stream or video stream) may be sent using the Bluetooth compliant interface of the network interface 410. The WiFi compliant interface of the network interface 410 may be used to send commands for controlling the virtual media network.

A user may access the virtual network media application 420 to control the virtual media network. As one example, the virtual network media application 420 may present a user interface to allow the user to select media nodes 104, 106, control their volume, playback, etc. In some embodiments, there is a master volume for the network and individual volumes for each media node 104, 106.

The media source application 430 may be any application that is capable of playing audio on the media source 400. For example, it could be an MP3 player, an Internet audio, a web browser, etc. In various embodiments, the media will be played on whatever output device is selected by the user. This output device selection may be under control of the operating system (OS) 440. For example, the OS 440 may provide for a pop-up window that allows the user to select the output device. One or more of the media nodes 104, 106 may appear as selections. By selecting one of the media nodes 104, 106, the media signal associated with the audio application may be sent from the media source 400 to the selected media node 104, 106 over network interface 410. In some embodiments, the media library 450 is used to decode the media. The media library sends the decoded media to the network media driver 445, which sends the media signal to the selected output device. If the media node 104, 106 is selected as the output device, the media signal is sent over network interface 450. In some embodiments, the network media driver 445 is a Bluetooth driver. However, network media driver 445 may be compliant with any protocol.

Note that with the foregoing embodiment, the virtual media application 420 never touches the media signal. This may provide the advantage that any media source 430 may be used when sending the media signal to the media node 104, 106 by selecting the appropriate output device for the media source 400. Thus, some embodiments of a virtual network media application 420 are compatible with any media source application 430. Moreover, no changes may be required to the media source application 430

As has been previously discussed, some embodiments of a gateway media node 104 have the ability to perform reformatting and processing of the media signal so that it is compatible with the virtual media network. Thus, the gateway media node 104 may offload much of the processing from the media source 102.

It will be appreciated that media source 400 illustrates one example and that many modifications may be made to the media source 400 while still implementing the methods and techniques described herein. For example, in some embodiments, the network media driver 445 includes a virtual network media driver and the virtual network media application 420 may not be present. In such an embodiment, the user may install the virtual media network driver 445 to aid in sending the media signals to the media nodes 104, 106. When the user desires to have the media signal sent to a media node 104, 106, the user simply selects the media node in an interface presented by the OS 440. This selects the virtual network media driver 445. For example, the media signal may be provided to the virtual network media driver 445 from the media library 450. As with a previous example, the media source application 430 may be any application that is used for playing media.

The virtual network media application 420 may be similar to the previously described. For example, the virtual network media application 420 may provide an interface for the user to select media nodes 104, 106 to add to the virtual network, and to control the network. The virtual network media application 420 is be optional in some embodiments, as its functionality may be incorporated into the virtual network media driver 445.

Additionally, a command channel may be used to send commands and a data channel may be used to send the media signal using via the network interface 410 using the same protocol. For example, the commands and data may both be transmitted according to a WiFi protocol or Bluetooth protocol. As noted above, the commands and data may alternatively be transmitted according to different protocols.

Note that by incorporating a driver 445 in the OS 440, media signals from any media source application 430 may be sent to the media node 104, 106. All the user needs to do is to select one of the media nodes 104, 106. In response, the virtual network media driver 445 is used. Therefore, the virtual media network can be used with any media source application 430 that runs on the media source 400.

In some embodiments, the media source application 430 is embedded in the virtual network media application 420. In some such embodiments, any media that is played by the media source application 430 is sent to a media node 104, 106.

In various embodiments, the media is simultaneously rendered by the media source 400 and the media nodes 104, 106 belonging to the virtual media network. For example, the media source 400 may render a video channel of the media, while the media nodes 104, 106 may render audio channels of the media. In some such embodiments, the various media channels are kept in sync. For example, the media source 400 may send timestamps along with the media data to indicate when the media data should be rendered by the media nodes 104, 106. Similarly, the gateway 104 may also include timestamps associated with the media data when forwarding the data to other media nodes 104, 106. To enable such exchange of timestamps, the various media devices 104, 106, 400 may have a common reference clock, such as a virtual wall clock, or a method of translating time stamps among various time domains, as will be described in greater detail below.

Figure 5:
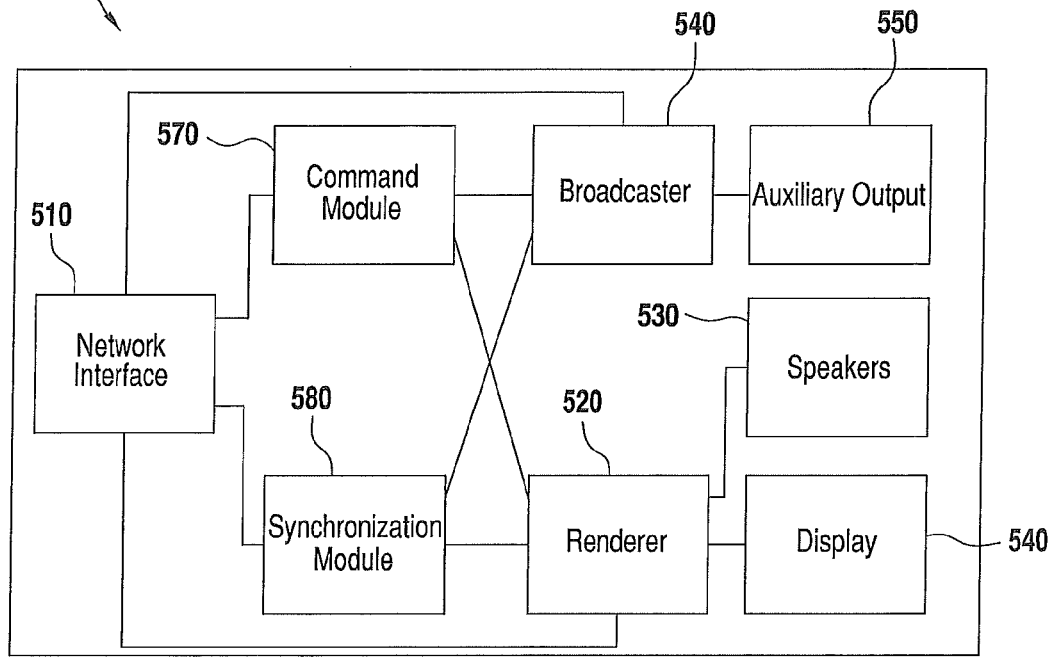
FIG. 5 illustrates an exemplary component diagram of a media node.

FIG. 5 illustrates an exemplary component diagram of a media node 500. The media node 500 may correspond to one or mote of the media nodes 104, 106 of the exemplary environment 100. The media node 500 may have network interface 510. The network interface 510 may enable communication according to one or more wireless or wireline protocols. In various embodiments one or more antennae are be connected to the network interface 510. In some embodiments, the network interface 510 is be both Wi-Fi compliant and Bluetooth compliant. Additionally or alternatively, the network interface 510 could be compliant with any other protocol. In some embodiments, the network interface 510 includes one or mote wireline network interfaces.

The renderer 520 may be responsible for processing the media signal for presentation on the speakers 530, display 540, or other output device (not shown). It will be appreciated that various alternative media nodes may not include speakers 530 or display 540, depending on the type of media the media node is designed to render. Furthermore, the media node 500 may not include the renderer 520 where the media node 500 is designed to only function as a gateway or other broadcaster and not a rendering device. The rendering module may receive the media signal from the network interface 510.

The broadcaster 550 may be able to forward a media signal to other appropriate media nodes 104, 106 via the network interface 510. The auxiliary output 560 may be used to provide a media signal to a device such as a home stereo system. In some embodiments, the broadcaster 550 handles forwarding media signals to the auxiliary output 560. In various embodiments, the media node 500 does not include the auxiliary output 560. Furthermore, the media node 500 may not include the broadcaster 550 where the media node 500 is designed to only function as a rendering device and not a gateway or other broadcasting device.

The command module 570 may be able to process commands to control the media signal. These commands could include volume, play, pause, etc. The synchronization module 580 may be responsible for precise synchronization of the media signal during playback on the various media nodes in the network. As will be described in greater detail below, the synchronization module 580 may transmit or receive beacon messages for use in establishing an initial clock synchronization. Additionally, after a media stream has begun, the synchronization module 580 may insert or extract timestamps from media packets for use in improving or correcting clock synchronization during media playback.

Media nodes 104, 106 can be controlled through a variety of mechanisms. Controllers may include a SmartPhone App, Tablet App, a UI on a TV or set-top box, buttons with or without a display on the node, or a PC app. In some embodiments, these devices control whether a renderer 520 renders a particular stream or particular channels thereof, the volume output of the renderer 520, and a master volume.

In some embodiments, the media node 500 supports a command protocol. The command protocol may include methods to turn on/off audio playback, aggregate audio playback into synchronized zones, transport controls such as play, forward, reverse, and seek, metadata transmission to nodes, announcement of network state to devices joining the network, updates of state when devices leave the network, control via remote user interfaces, and other messages and methods to maintain the airtime network.

Note that the elements of the media node 500 may be implemented with software, hardware, or a combination of software and hardware. The media node 500 may have one or more processors and computer readable storage media with instructions thereon, which when executed on the one or more processors, implement functionality of various elements of the media node 500.

Figure 6:
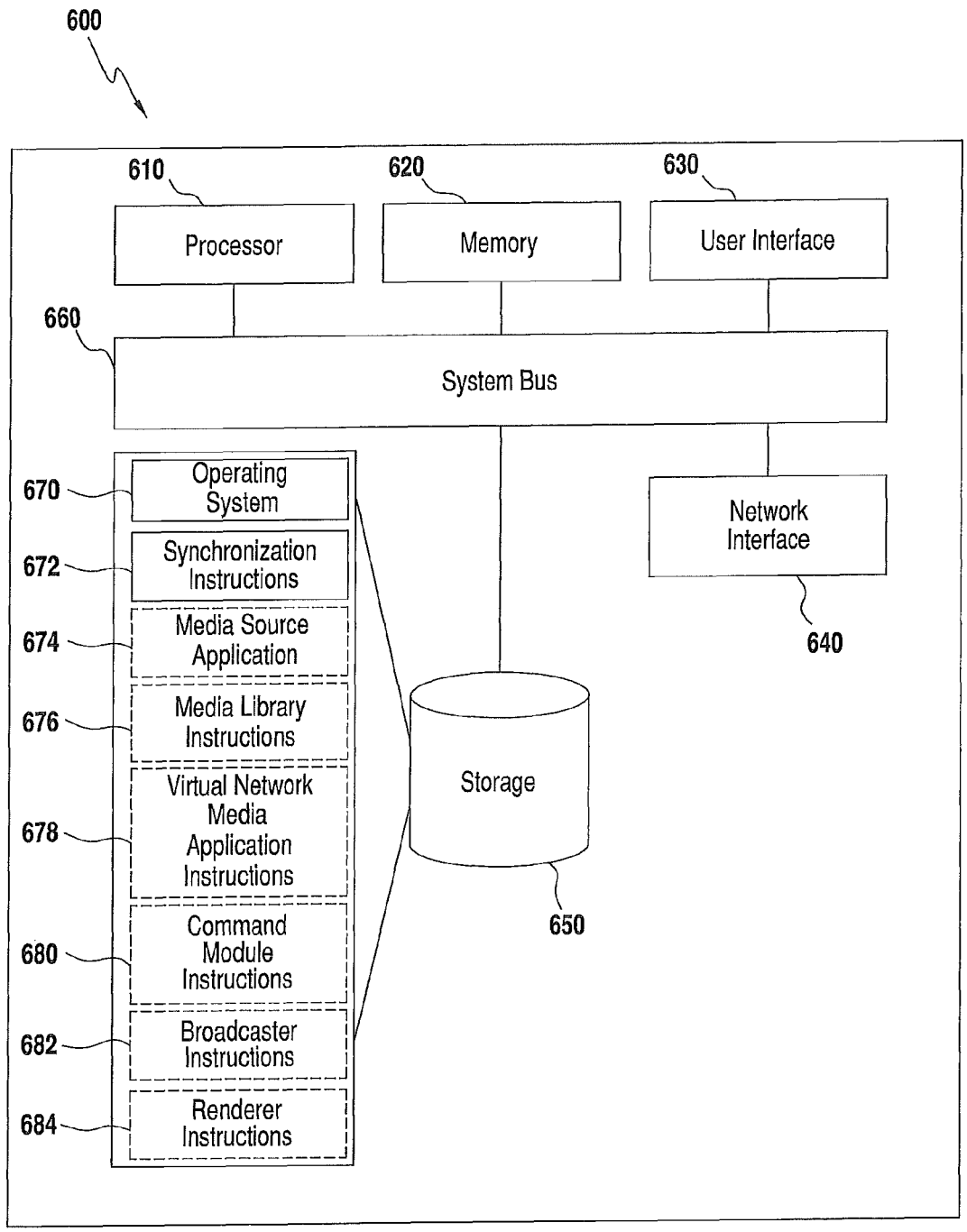
FIG. 6 illustrates an exemplary hardware diagram of a media device.

FIG. 6 illustrates an exemplary hardware diagram of a media device 600. The exemplary media device 600 may correspond to any of the media devices 102, 104, 106 of the exemplary environment 100, the media source 400, or the media node 500. As shown, the hardware device 600 may include a processor 610, memory 620, user interface 630, network interface 640, and storage 650 interconnected via one or mote system buses 660. It will be understood that FIG. 6 constitutes, in some respects, an abstraction and that the actual organization of the components of the media device 600 may be more complex than illustrated. For example, the processor 610 and memory 620 may be connected via a local microprocessor bus, and the user interface 630, network interface 640, and storage 650 may be connected via one or mote input/output buses.

The processor 610 may be any hardware device capable of executing instructions stored in memory 620 or storage 650. As such, the processor may include a microprocessor, field programmable gate array (FPGA), application-specific integrated circuit (ASIC), or other similar devices.

The memory 620 may include various memories such as, for example L1, L2, or L3 cache or system memory. As such, the memory 620 may include static random access memory (SRAM), dynamic RAM (DRAM), flash memory, read only memory (ROM), or other similar memory devices.

The user interface 630 may include one or more devices for enabling communication with or rendering of media for a user. For example, the user interface 630 may include a display, speakers, a printer, an auxiliary output, a mouse, a keyboard, an alphanumeric keypad, trackball, stylus, or buttons.

The network interface 640 may include one or more devices for enabling communication with other hardware devices. For example, the network interface 640 may include one or more network interface cards (NICs) configured to communicate according to the Ethernet protocol, TCP/IP protocols, WiFi protocol, or Bluetooth protocol. Various alternative or additional hardware or configurations for the network interface 640 will be apparent.

The storage 650 may include one or more machine-readable storage media such as read-only memory (ROM), random-access memory (RAM), magnetic disk storage media, optical storage media, flash-memory devices, or similar storage media. The storage may also include a portable non-volatile storage medium, such as a floppy disk, to input and output data and code to and from the media device 600. In various embodiments, the storage 650 stores instructions for execution by the processor 610 or data upon with the processor 610 may operate. For example, the storage may store an operating system 670 for coordinating the basic functions of the media device 600 and synchronization instructions 672 for transmitting information sufficient for another media device to synchronize playback or for processing such information transmitted by another media device to synchronize playback.

Depending on the role or capabilities of the media device 600, the storage 650 may store various additional instructions. For example, where the media device 600 is capable of functioning as a media source, the storage 650 may store media source application instructions 674 for obtaining or playing media on the device 600, media library instructions 676 for decoding media, or virtual network media application instructions 678 for enabling a user to transmit commands to the virtual media network. Various other functionalities for these instructions 674, 676, 678 will be apparent in view of the foregoing description, such as the description of the exemplary media source 400. Where the media device 600 is additionally or alternatively capable of functioning as a media node, the storage may store command module instructions 680 for processing commands issued by a media source or other controller, broadcaster instructions 682 for forwarding media to other media nodes, and renderer instructions 684 for rendering media in synchronicity with other devices. Various other functionalities for these instructions 680, 682, 684 will be apparent in view of the foregoing description, such as the description of the exemplary media node 500.

The components contained in the media device 600 are those typically found in computer systems suitable for use with the methods and systems described herein, and are intended to represent a broad category of such computer components. Thus, the media device 600 can be a cellular telephone, smart phone, PDA, tablet computer, personal computer, mobile computing device, workstation, server, minicomputer, mainframe computer, or any other computing device. The computer can also include different bus configurations, networked platforms, multi-processor platforms, etc. Various operating systems 660 can be used including Unix, Linux, Windows, Macintosh OS, Palm OS, Android OS, iOS, and other suitable operating systems.

Figure 7:
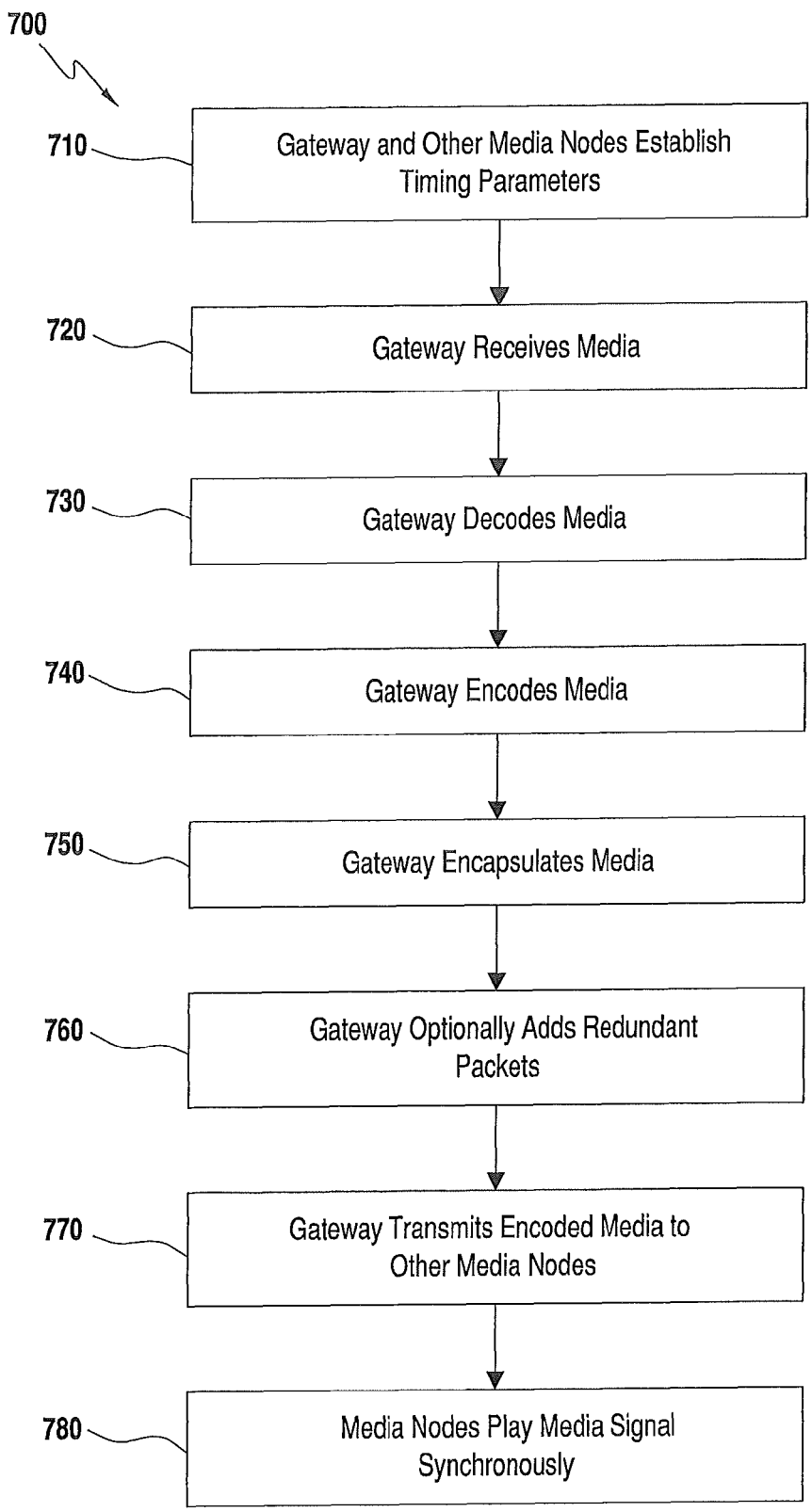
FIG. 7 illustrates an exemplary method of broadcasting a media signal.

FIG. 7 illustrates an exemplary method 700 of broadcasting a media signal. The method 700 may correspond to step 210 of method 200. In step 710, the gateway media node 104 and the other media nodes 102, 104, 106 may establish timing parameters. In some embodiments, media nodes 104, 106 synchronize to a virtual wall clock. The virtual wall clock may be used by the broadcaster to timestamp the media stream with the intended render time. The virtual wall clock may be used by renderers to precisely render the media samples at given time. The virtual wall clock may help ensure that the media nodes 104, 106 have a common understanding of render time. In some embodiments, each rendering device renders samples at the time specified in the media stream. Other information for the rendering of the stream may also be included in the stream format including sampling frequency, word size, number of channels, encoding format, etc.

The virtual wall clock or some other common timing reference may be established in step 710. For example, the gateway media node 104 may initiate a "flood" of beacon messages including timestamps indicating when each beacon message was transmitted. Then, the receiving media node 104, 106 may calculate an offset value by determining the difference between the sender's timestamp and the time each beacon message was transmitted. This calculated offset may reflect the sum of three independent values: the true offset between the clocks of the sending device and the receiving device; the fixed delay associated with times such as network propagation time, the time taken by the sending device between inserting a timestamp and actually transmitting the beacon message, and the time taken by the receiving device between receiving the beacon message and determining the time of receipt; and variable delay associated with network fluctuations and which are common to various wireless network connections. Because the fixed delay is virtually constant, the receiving device may be assured that the minimum calculated offset is, of those calculated offsets, the offset that includes the smallest variable network delay and is therefore the closest available estimation of the true clock offset plus the fixed network delay. The receiving device may then adjust its own clock based on the minimum offset or persist the offset for use in comparing subsequent sending device timestamps to the local clock. The fixed network delay may be taken into account during the rendering process to ensure a proper synchronization. Similar methods may be used to establish synchronization between the media source 102 and media gateway 104.

In step 720, the gateway media node 104 receives a media signal from the media source 102. In step 730, the gateway media node 104 decodes the media. The gateway may demultiplex the media signal prior to decoding.

In step 740, the gateway media node 104 re-encodes the media for broadcast to other media nodes 104, 106. Note that the gateway may use a different encoding than the media source 2102 used. For example, the media signal may have been encoded at the media source 102 in a format that is compatible with Bluetooth. It may be re-encoded in a format that is compatible with Wi-Fi.

In step 750, the gateway media node 104 encapsulates the media signal. In various embodiments, the gateway media node 104 compresses the media signal. As an example of compressing an audio media signal, in high quality networks, a light lossless compression technique such as Free Audio Lossless Codec (FLAC) can be used to cut bandwidth in half with minimal processing overhead. In low quality networks, a higher compression standard such as OGG or Advance Audio Coding (AAC) can be used to minimize network bandwidth at the expense of sound quality and processing overhead. Beyond the compression algorithm itself, the signal can resampled to a lower sampling rate, down-mixed to a mono stream, or down-sampled to a lower sample resolution. Encoding or transcoding the media stream to a compressed form can improve airtime reliability by using less network bandwidth at the expense of processing overhead. Supported codecs can include lossless and lossy compression techniques of various bitrates, sampling frequencies, channels, and sample sizes.

All media nodes 104, 106 are cognizant of the supported encoding formats in some embodiments. All broadcasters are capable of encoding into the supported formats in some embodiments. All renderers are capable of decoding the supported formats in some embodiments. The encoding format that is used for each stream may be determined among the media nodes 104, 106 with feedback from network quality, available processing resources, the number of rendering zones being supported, the number of active streams being supported, and the maximum acceptable latency.

In optional step 760, redundant packets are added. If the media signal has been compressed, additional packets may be added. In some embodiments, a group of packets is interleaved with a group of redundant packets. For example, with a 2:1 compression ratio, two seconds of the original media signal may be compressed to one second. As one example, one second worth of data packets may be interleaved with one second of redundant packets. The number of packets in a group could be one or higher.

Broadcasting has two options in some embodiments. In option A, as illustrated, the gateway media node 104 may broadcast the media signal to other media nodes 10 in step 770. In option B (not shown), the gateway media node 104 may send the media signal to a wireless access point. The wireless access point may broadcast the media signal to other media nodes.

Broadcast media may be the largest consumer of network bandwidth. Typical uncompressed audio streams can exceed over 1.5 mbps. Transmission can consume 1.5 mbps per stream up to the access point 310 and an additional 1.5 mbps per stream down to the renderer 306 for a total of 3 mbps. For point-to-point simulcasting, the typical bandwidth may be 3 mbps times the number of simulcast streams. This has the potential for saturating the network.

Various embodiments support multiple transmission protocols. In some embodiments, UDP over IP is used. Note that in some embodiments, the receiving media node is not requited to acknowledge reception of packets. For example, UDP over IP may not require reception of packets. In some embodiments, the receiving media node may request the gateway to re-send a data packet that is not received. Note that this may occur in an embodiment that uses UDP over IP. As mentioned above, in some embodiments, redundant data packets are sent.

Network statistics may be maintained by media nodes 104, 106. The elected broadcaster or gateway is responsible for determining the best transmission methods to balance quality of service, latency, processor utilization, and network utilization, in various embodiments. For example if the network is of good quality, with high available bandwidth and strong connections to individual nodes 104, 106, a guaranteed transmission protocol can be used. If the network is saturated or of lower quality, a multicasting technique may be preferable. Additional methods can help conserve bandwidth, and detect, correct or conceal transmission errors. In general, multicasting, simulcasting and point-to-point protocols are supported with the most suitable protocol determined at the time of stream construction with network quality, available processing power, and the number of streams being contributing factors in the decision process.

The media clock may be recovered through the media stream with reference to the wall clock and may be synchronized to media frames or groups of samples. The media clock may drive the formation of the hardware frame clocks, word clocks, and bit clocks. Synchronizing via the media stream may guarantee accurate clocks can be generated at the media nodes 104, 106 from a logical viewpoint. Slight variations in hardware, such as with crystals, can cause clock drift and other variances in clock timing. Constant measurement and comparison of the media clock and wall clock allows the system to detect drift. In some embodiments, a software-only media clock recovery mechanism involves adding or removing media samples to and from the media rendering buffers to re-sync media clocks across devices. In some embodiments, the rendering buffer manipulation is done in a way that does not cause the effects of obvious clicking or skipping. A hardware mechanism, using VCXOs, or voltage controlled oscillators, can be controlled from the processor based on drift measurements and push or pull the hardware oscillators into tighter synchronization.

As noted above, various systems described herein may synchronize media playback between multiple devices by establishing a common timing reference. For example, a media source and a media gateway may cooperate to establish such a common timing reference or a media gateway and a media node may cooperate to establish such a common timing reference. In the context of establishing timing parameters, the method may be split between two media devices: a sending media device and a receiving media device. In various embodiments, the common timing reference is an estimation at the receiving media device of a clock value at the sending media device.

Figure 8:
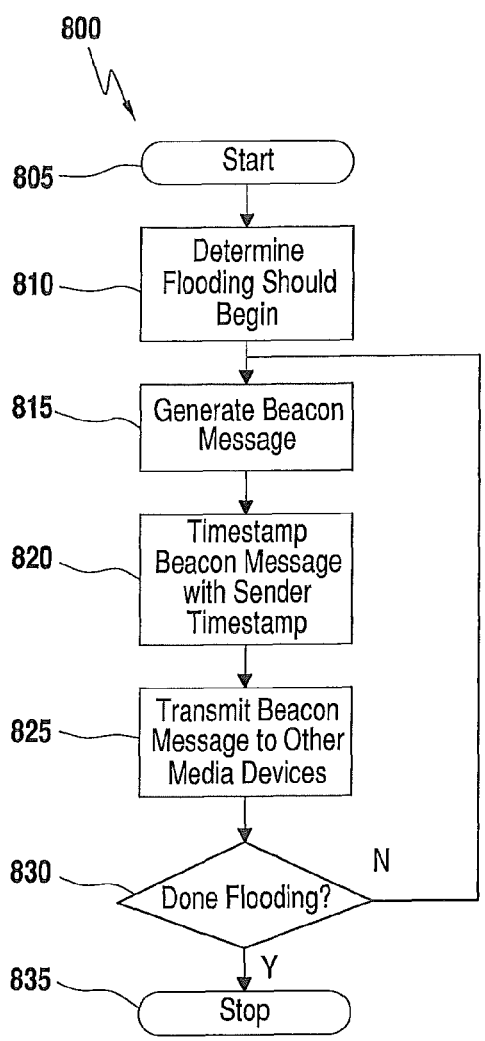
FIG. 8 illustrates an exemplary method for a sending media device to synchronize playback with a receiving media device.

FIG. 8 illustrates an exemplary method 800 for a sending media device to synchronize playback with a receiving media device. The exemplary method 800 may be performed by any media device that functions as a sending media device such as, for example, a media source 102 or a media gateway 104 of the exemplary environment 100. The method 800 may be performed as a part of step 710 of exemplary method 700 or at any time when synchronization of timing parameters between media devices is appropriate.

The method 800 begins in step 805 and proceeds to step 810 where the sending device may determine that the sending device should begin flooding "beacon messages" for use by the receiving device in establishing timing parameters. For example, the sending device may determine that the receiving device has powered up, that the receiving device has been added to the virtual media network, or that the sending device is to begin transmitting media to the receiving device. In step 815, the sending device generates a new beacon message. The beacon message may be any type of packet or other data message that will be recognized by the receiving device. For example, the beacon message may be formed according to a proprietary protocol that both the sending device and receiving device implement. In various embodiments, such as embodiments wherein the beacon message may traverse one or more intermediate devices such as routers or switches en route to the receiving device, the sending device constructs the beacon message to carry a flag or other indication that the beacon message constitutes high priority traffic. The various mechanisms for prioritizing a beacon message within the network will vary based on the individual prioritization schemes utilized by the various possible networking technologies. Such prioritization of beacon messages may help to optimize routing times through mixed topology networks and thereby reduce the variable network delay factor.

Next, in step 820, the sending device timestamps the beacon message with the time as currently represented by the sending device's clock. Such a timestamp may be referred to as the "sender timestamp." Next, in step 825, the sending device transmits the beacon message to one or mote receiving devices. The time that elapses between steps 820 and 825 forms part of the fixed delay component of the clock offset values that will be calculated by the receiving device. As such, various implementations of the method 800 strive to reduce or minimize the number of operations that occur between steps 820 and 825. In various embodiments, the sending device plays a role in establishing timing parameters with respect to multiple other media devices. For example, a media gateway 104 may transmit beacon messages to multiple other media nodes 104, 106. In some such embodiments, the sending device transmits the beacon message to multiple media devices in step 825 by, for example, addressing copies of the beacon message to each media device separately or by multicasting the message to the multiple media devices. Alternatively or additionally, the sending device executes method 800 multiple times to accommodate multiple other media devices.

In step 830, the sending device determines whether the sending device is finished flooding beacon messages to the receiving device. For example, the sending device may continue flooding beacon messages until a predetermined number of beacon messages have been transmitted. In various embodiments, the sending device alternatively or additionally bases the condition of step 830 on feedback from the receiving device. For example, the receiving device may send a message when a sufficient synchronization has been achieved or a message indicating that sufficient synchronization has not been achieved in spite of the transmission of a predetermined number of beacon messages. As yet another method of determining whether flooding should cease, the sending device monitors network performance during the flooding period and continue flooding until the network performance meets some minimum acceptable threshold. For example, the sending device may, in addition to the beacon messages, transmit roundtrip diagnostic messages to the receiving device. Alternatively, the receiving device may be configured to additionally transmit the beacon messages back to the sending device for network diagnostic purposes. Upon receiving the message back from the receiving device, the sending device generates one or more measures of network performance. For example, the sending device may generate measures of network delay or jitter over the previous flooding window and, if the measures are lower than some minimum acceptable network performance, continue flooding beacon messages even though a predetermined number of beacon messages have been transmitted. It will be apparent in view of the teachings herein that various combinations of these and other methods for determining the sufficiency of beacon message flooding may be employed.

If the sending device determines in step 830 that beacon message flooding should continue, the method 800 loops back to step 815 to transmit additional beacon messages. In various embodiments wherein a flooding window includes the transmission of a predetermined number of beacon messages, the sending device determines that a previous window was insufficient based on the network performance or other factors and may reset a beacon message counter prior to looping back to step 815, thereby initiating the transmission of another set of beacon messages in a new window. On the other hand, if the sending device determines in step 830 that flooding should end, the method 800 proceeds to end in step 835. Thereafter, the sending device proceeds to transmit media to the now-synchronized receiving device.

It will be noted that, in various embodiments, the sending device may not receive any return messages from the receiving device based on the beacon messages or, in embodiments wherein the sending device does receive return messages, the sending device does not utilize any return messages for the purpose of establishing timing parameters. In some embodiments, return messages are used only for the purposes of judging the sufficiency of the flooding period. As such, and unlike other clock synchronization methods, the methods described herein may be referred to as "one-way" synchronization methods wherein the majority of the synchronization calculations are performed by the receiving device, rather than the sending device.

Figure 9:
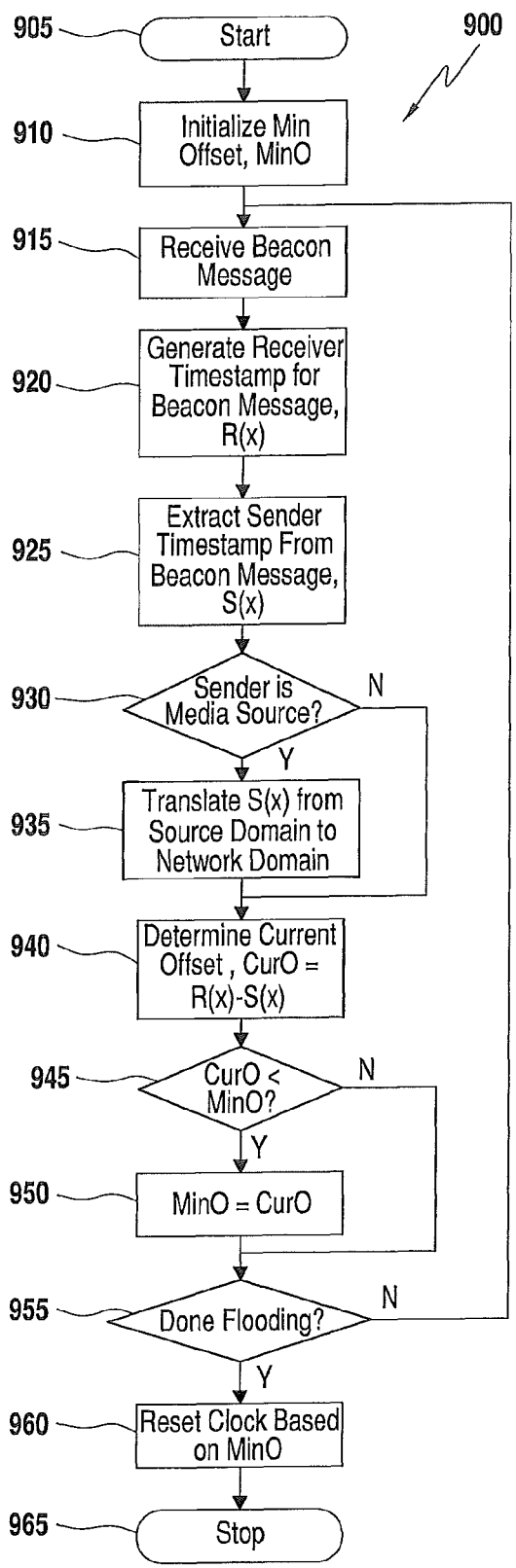
FIG. 9 illustrates an exemplary method for a receiving media device to synchronize playback with a sending media device.

FIG. 9 illustrates an exemplary method 900 for a receiving media device to synchronize playback with a sending media device. The exemplary method 900 may be performed by any media device that functions as a receiving media device such as, for example, a media gateway 104 or other media node 104, 106 of the exemplary environment 100. The method 900 may be performed as a part of step 710 of exemplary method 700 or at any time when synchronization of timing parameters between media devices is appropriate.

The method 900 begins in step 905 and proceeds to step 910 where the receiving device initializes a minimum offset variable "MinO" for use in keeping a running minimum offset value as new messages are received or processed. Next, in step 915, the receiving device receives a beacon message from the sending device. Then, in step 920, the receiving device generates a timestamp based the time as currently represented by the receiving device's clock. Such a timestamp may be referred to as the "receiver timestamp," "R(x)." The time that elapses between steps 915 and 920 forms part of the fixed delay component of the clock offset values that will be calculated by the receiving device. As such, various implementations of the method 900 strive to reduce or minimize the number of operations that occur between steps 920 and 925.

In step 925, the receiving device extracts the sender timestamp, "S(x)," from the beacon message. As discussed above, the sender timestamp is inserted into the beacon message by the sender device shortly before transmission, such as in step 820 of exemplary method 800. In step 930, the receiving device determines whether the sending device is the media source of the virtual media network. For example, if the receiving device is operating as a gateway for the virtual media network, the receiving device determines that the sending device is a media source. In such a case, the method 900 proceeds to step 935. The receiving device then translates the sender timestamp from a time domain of the sending device to the time domain of the virtual media network. Such translation may involve adding or subtracting an offset previously negotiated between the two devices. Such negotiation and translation between time domains may be performed according to any method known to those of skill in the art. In some alternative embodiments, the source device and media nodes maintain clocks in the same time domain. In some such embodiments, steps 930, 935 are not be present.

After translating the sender timestamp into the virtual media network domain in step 935 or after determining that the sender is not the media source in step 930, the method 900 proceeds to step 940, where the receiving device calculates an offset value based on the sender timestamp and the receiver timestamp such as, for example, the difference between the two timestamps. This current offset value, "CurO," is equivalent to the true offset between the sender and receiver clocks plus any delay encountered by the beacon message between the creation of the two timestamps, S(x) and R(x). As noted above, this delay includes two components. A first component of the delay is the fixed delay associated with the time taken to traverse the hardware and software components of the network such as, for example, constant delay associated with the circuits and datapaths over which the messages travel along with time taken by the OS between transmission/receipt of a message and generation of the associated timestamp. Such a fixed delay may already be taken into account as part of the rendering process. The second component of the delay is the variable network delay associated with the delay that changes over time. For example, shared medium networks such as WiFi may wait for the medium to be clear before transmission and, as such, may introduce different delays at different times.

Because the variable delay only introduces additional delay (and does not remove delay), a better estimate of the true clock offset is obtained from the message that was delayed the least. As such, the method 900 searches for the minimum offset value obtained during the flood as a best available estimate of the true offset. In step 945, the receiving device compares the current offset, CurO, to the previously located minimum offset or if the current iteration of the loop is the first to the minimum offset value as initialized in step 910, MinO. If CurO is less than MinO, then CurO is known to represent a closer estimate of the true offset between the sender and receiver clocks and, in step 950, the receiver device overwrites the value of MinO with the value of CurO.

In step 955, the receiver device determines whether the sender device is done flooding beacon messages. For example, the receiver device may determine whether a timeout has occurred when waiting for an additional beacon message, may determine that the sender device has begun sending media messages, may determine that a predetermined number of beacon messages has been received, or may determine that the sending device has transmitted a special message indicating the end of flooding. In various embodiments, the receiver device determines whether the flooding was sufficient to establish a desired accuracy of an offset. For example, the receiver device may track the intervals at which the beacon messages are received and, based on a comparison of the measured intervals to a known time interval, may determine whether or not the network was stable enough to produce the desired accuracy of an offset value. If the network was not sufficiently stable, the receiving device transmits a message to the sending device indicating that additional flooding should be performed. Various modifications will be apparent. It will be apparent in view of the teachings herein that various combinations of these and other methods for determining the sufficiency of beacon message flooding may be employed.

If the receiving device determines that additional flooding is being or will be performed, the method 900 loops back from step 955 to step 915 to process additional beacon messages. Otherwise, the method 900 proceeds to step 960 where the receiving device resets the local clock based on the determined minimum offset. For example, the receiving device may subtract MinO from the current clock value to set the local clock to a new value estimated to be closer to the actual clock value of the sending device. In some embodiments wherein the fixed delay of the network is known or estimated, the receiving device subtracts MinO from the current clock value and add back in fixed delay value to attempt to isolate the true clock offset value of the computed offset value. In some embodiments, the receiving device does not alter the local clock at all and, instead, may maintain the minimum offset value, MinO, for use in comparing timestamps received from the sender device and the local clock. For example, the receiving device may add MinO to the timestamp prior to any such comparison. Various other modifications will be apparent. The method 900 may then proceed to end in step 965.

In various alternative embodiments, the receiving device utilizes a previously established lower bound offset to help ensure that an unreasonably large offset calculated during the flooding period is not used to reset the clock. For example, if the flooding period is encompassed by a period of high variable network delay, the calculated offset may be much larger than the true value of the offset between the sender and receiver clocks. In some such embodiments, the receiver first compares the minimum offset calculated in steps 940-950 to the previously established lower bound offset to determine whether the minimum offset is greater than the lower bound offset. If so, the receiver declines to update the clock based on the minimum offset and continues to use to previously-established lower bound. Otherwise, the receiver updates the clock as detailed in step 960 because the minimum offset value is less than, and therefore a better estimate, than the lower bound. An exemplary method for determining a lower bound will be described in greater detail below with respect to FIG. 11.

In various embodiments, the receiving device performs the method 900 periodically to reestablish synchronization. In some such embodiments, the receiving device resets the clock to its original value, deletes a stored offset value, or otherwise "rolls back" any changes made based on previous executions of the method 900 to thereby "start over" in determining a clock offset. By periodically reestablishing the clock offset, the receiving device may better account for clock drift between the sending device and receiving device clocks.

It will be apparent in view of the teachings herein that, while method 900 is described as a real time method that processes each beacon message as it is received, various alternative embodiments utilize methods that process beacon messages as a batch. For example, in some such embodiments, the receiving device receives multiple beacon messages, timestamps the messages at the time of receipt, and at a later time processes the received messages in sequence to locate a minimum offset in a manner similar to that described with respect to steps 925-960.

It will be understood that, while the foregoing methods attempt to generate a best estimate of the clock offset between two devices. It is possible that network conditions may temporarily improve after this initial flooding period and that a better estimate may be obtained later. Accordingly, methods may be employed after the initial timing parameter establishment to attempt to better estimate the clock offsets. Such methods may also address the possibility of clock drift, wherein differences in the crystal, temperature, or other parameters may cause the sending device clock and receiving device clock to operate at slightly different rates.

Figure 10:
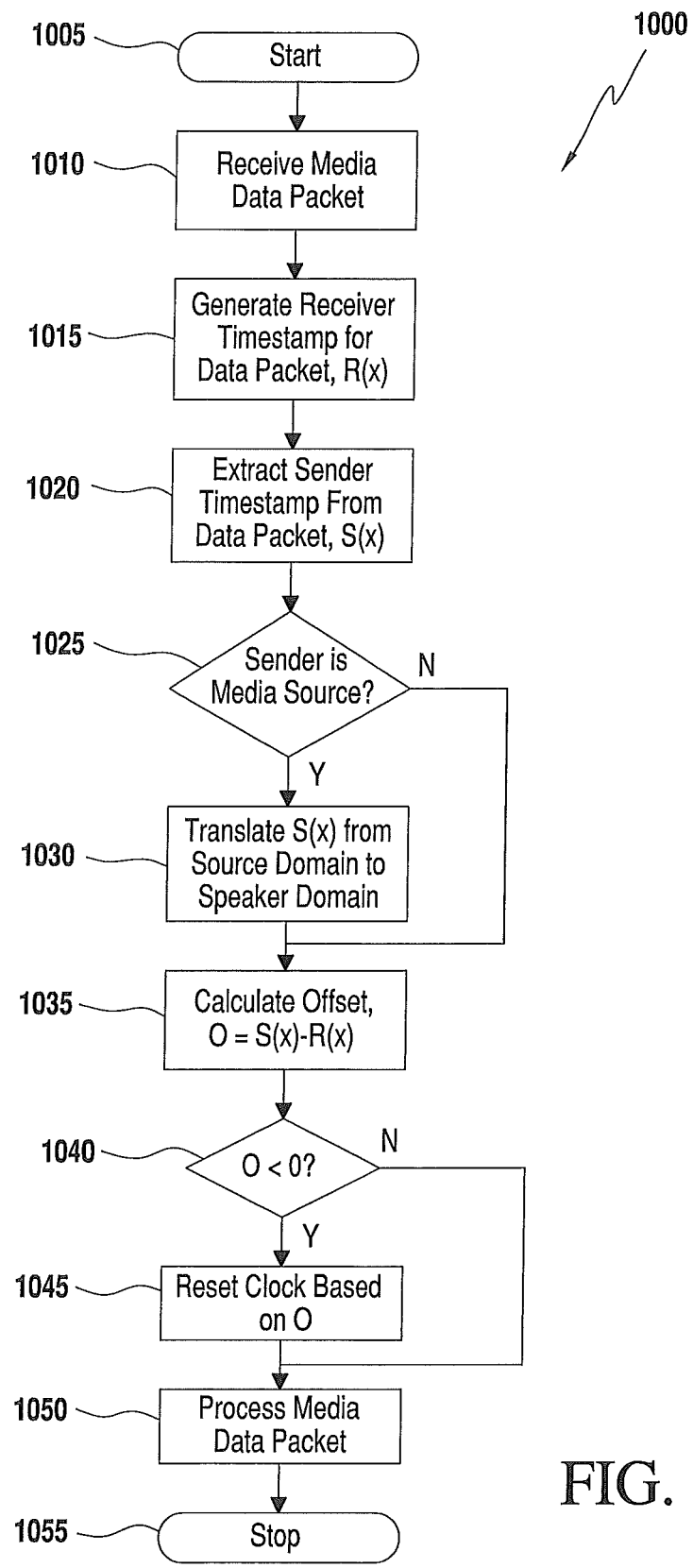
FIG. 10 illustrates an exemplary method for a receiving media device to obtain better playback synchronization during media streaming.

FIG. 10 illustrates an exemplary method 1000 for a receiving media device to obtain better playback synchronization during media streaming. The exemplary method 1000 may be performed by any media device that functions as a receiving media device such as, for example, a media gateway 104 or other media node 104, 106 of the exemplary environment 100. The method 1000 may be performed as a part of step 780 of exemplary method 700 or at any time when synchronization of timing parameters between media devices is appropriate.

The method 1000 begins in step 1005 and proceeds to step 1010 where the receiving device receives a media data packet from the sending device. Next, in step 1015, the receiving device generates a timestamp based the time as currently represented by the receiving device's clock, R(x). In step 1020, the receiving device extracts the sender timestamp, "S(x)," from the media data message. The sender timestamp may have been inserted into the media data message by the sender device shortly before transmission. In step 1025, the receiving device determines whether the sending device is the media source of the virtual media network. For example, if the receiving device is operating as a gateway for the virtual media network, the receiving device may determine that the sending device is a media source. In such a case, the method 1000 proceeds to step 1030. The receiving device then translates the sender timestamp from a time domain of the sending device to the time domain of the virtual media network. Such translation may involve adding or subtracting an offset previously negotiated between the two devices. Such negotiation and translation between time domains may be performed according to any methods known to those of skill in the art. In some alternative embodiments, the source device and media nodes maintain clocks in the same time domain. In some such embodiments, steps 1020, 1030 are be present.

After translating the sender timestamp into the virtual media network domain in step 1030 or after determining that the sender is not the media source in step 1025, the method 1000 proceeds to step 1035, where the receiving device calculates an offset value based on the sender timestamp and the receiver timestamp such as, for example, the difference between the two timestamps. In the case where the sender timestamp has been translated, the translated timestamp is used in calculating the offset. This offset value, "O," is equivalent to the true offset between the sender and receiver clocks plus any delay encountered by the media data message between the creation of the two timestamps, S(x) and R(x), including both fixed and variable delay. In step 1040, the receiving device determines whether the offset value represents a better estimation of the offset between the clocks than previously utilized. For example, in various embodiments wherein the previously-determined minimum offset is used to reset the clock of the receiving device, the receiving device determines whether the current offset, O, is less than zero. A positive result on this comparison indicates that the previously-used minimum offset may have incorporated some variable network delay and the subtraction thereof from the local clock "overshot" the ideal setpoint, thereby setting the local clock behind the sender's clock. The current offset, O, by incorporating less (or zero) variable delay than the previously-used minimum may reveal this overshoot by being a negative number. In such a case, the current offset, O, will be judged to reveal the new best estimate of the true clock offset and, in step 1045, may be used to reset the local clock again thereby at least partially correcting the previous overshoot. Various modifications for other embodiments will be apparent. For example, in embodiments wherein the previously-determined minimum offset is not used to modify the local clock and is instead persisted for use in timestamp comparisons, step 1040 determines whether the current offset, O, is less than the previous minimum offset, MinO, and, if so, the receiving device sets MinO equal to O in step 1045. Various other modifications will be apparent.

In various alternative embodiments, the receiving device utilizes a previously established lower bound offset to help ensure that an unreasonably large offset calculated during the flooding period is not used to reset the clock. In some such embodiments, the receiver first compares the offset calculated in step 1035 to the previously established lower bound offset to determine whether the offset represents a better estimate of the true offset than the lower bound offset. If so, the receiver declines to update the clock based on the minimum offset and continues to use to previously-established lower bound. Otherwise, the receiver updates the clock as detailed in step 1045 because the offset value is a better estimate than the lower bound. An exemplary method for determining a lower bound will be described in greater detail below with respect to FIG. 11.

In step 1050, the receiving device proceeds to process the received media packet to, for example, render media output at an appropriate time. For example, the receiving device may extract a presentation time, separate from the sender timestamp and the receiver timestamp, from the media data packet. Such a presentation time indicates a time at which the media data carried by the message should be rendered. After extracting the presentation time, the receiving device causes the media data to be rendered at a time matching the presentation time. For example, the receiving device may buffer the media data for playback by a local playback device or may forward the message to another media node for playback. It will be understood that a current time that "matches" a presentation time may encompass equivalence between the current time and the presentation timestamp but may also encompass other forms of matching. For example, in various embodiments, the current time matches when the current time minus a persisted minimum offset value equals the presentation timestamp. Additionally or alternatively, the comparison for matching adds, subtracts, or otherwise takes into account a fixed delay value. Various other methods for determining an appropriate time for playback based on a local clock, a presentation timestamp, and other potentially available values will be apparent. Further, the concept of a current time matching a presentation time based on a minimum offset value will be understood to encompass comparisons utilizing a local clock that has previously been modified by a minimum offset value but otherwise do not explicitly take the minimum offset value into account. Various embodiments perform such a comparison immediately prior to output to ensure that the data is output at the appropriate time. Other embodiments use such a comparison to insert the media data into a playback buffer at a position where the media is likely to be played back at the presentation time. Such insertion may involve the insertion of "dummy" data prior to insertion of the media data to adjust the timing of the playback. Various additional methods of controlling the playback timing of data in a buffer will be apparent.

Figure 11:
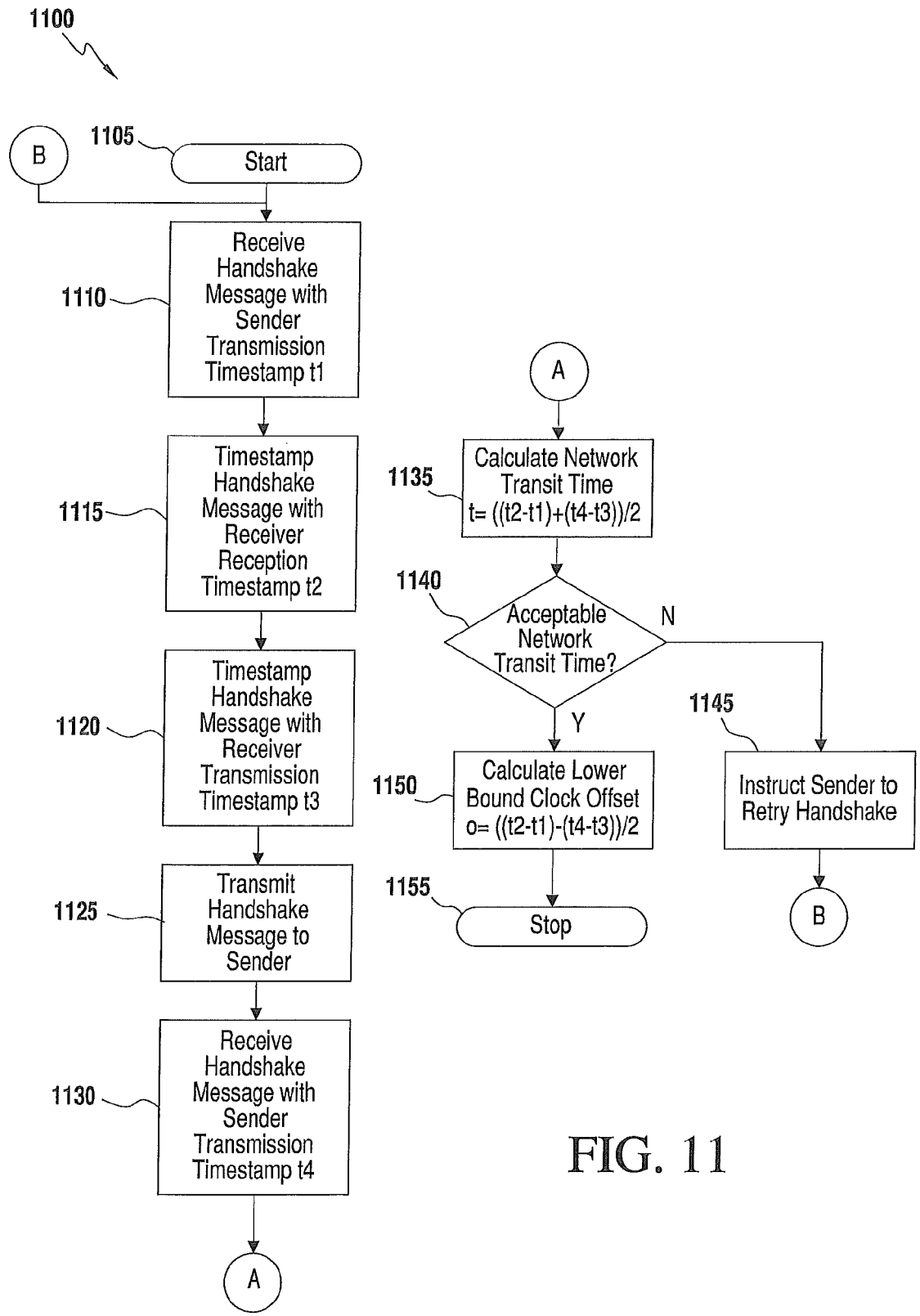
FIG. 11 illustrates an exemplary method of determining a lower bound offset.

FIG. 11 illustrates an exemplary method 1100 of determining a lower bound offset. As noted above, various alternative embodiments additionally establish a lower bound offset prior to beacon flooding and analysis of media packets to determine better clock offset estimates. The exemplary method 1100 may be performed by any media device that functions as a receiving media device such as, for example, a media gateway 104 or other media node 104, 106 of the exemplary environment 100. The method 1100 may be performed as a part of step 710 of exemplary method 700 or at any time when synchronization of timing parameters between media devices is appropriate.

The method 1100 may begin in step 1105 and proceed to step 1110 where the receiving device begins collecting timestamps from a round-trip transit between the receiving device and the sending device for calculation of a lower bound by receiving a handshake message from the sending device. In various embodiments, the handshake message is transmitted over a channel that is different from the channel over which beacon messages or media data packets are sent. For example, the handshake message may be transmitted over a Bluetooth channel while the beacon messages and media data packet messages may be transmitted over a WiFi channel. As part of the handshake protocol employed, the sender includes a timestamp in the handshake message indicating the time at which the sender transmitted the handshake message, t1, according to the sender clock. Then in step 1115, at a time close to the receipt of the handshake message in step 1110, the receiver records a receipt timestamp, t2, according to the receiver clock.

Next, the receiver device prepares to transmit the handshake message back to the sender device by generating, in step 1120, a timestamp indicating a time at which the receiver resends the handshake message, t3, to the sender according to the receiver clock. In some embodiments, the receiver may insert the timestamp t3 into the handshake message received from the sender or into a newly-generated handshake message. Then in step 1125, at a time close to the generation of the timestamp t4, the receiver transmits the handshake message to the sender. Next, in step 1130, the receiver may receive the handshake message back again from the sender. As part of the sender processing the handshake message, the handshake message now includes a timestamp indicating the time at which the sender received the handshake message, t4, according to the sender clock.

As will be explained below, the four timestamps, t1-4 may be used to calculate a lower bound offset. However, in some embodiments, the receiver device first uses the timestamps t1-4 to calculate a network transit time experienced by the handshake message to determine whether the network delay during the handshake process was sufficiently low to provide an accurate or otherwise acceptable lower bound. As such, the receiver device calculates, in step 1135, the transit time in step 1135 using the following formula: transit time=$((t2-t1)+(t4-t3))/2$. Next, the receiver determines whether the calculated transit time is acceptable by, for example, determining whether the transit time is less than a predetermined threshold. If the calculated transit time is unacceptable, the receiver device instructs the sender to retry the handshaking process in step 1145 and loops back to step 1110 to reattempt the process. If, on the other hand, the network transit time is acceptable, the receiver calculates the lower bound offset using the timestamps in step 1150 using the following formula: lower bound offset=$((t2-t1)-(t4-t3))/2$. The method then proceeds to end in step 1155.

It will be apparent that, in some embodiments, the sender clock may be behind the receiver clock such that the timestamps produced by the receiver device are less than the timestamps produced by the sender device. It will be appreciated that the lower bound clock offset formula above may indicate the direction of the clock adjustment based on the sign of the calculated value. In some embodiments, the receiver device may utilize absolute values when comparing various calculated offsets to determine which offset is a better estimation, such that only the magnitudes are compared and not relative adjustment directions.

In various embodiments, the receiving device performs the method 1100 periodically to reestablish synchronization. In some such embodiments, the receiving device resets the clock to its original value, deletes a stored lower bound offset value, or otherwise "rolls back" any changes made based on previous executions of the method 1100 to thereby "start over" in determining a clock offset. By periodically reestablishing the lower bound offset, the receiving device may better account for clock drift between the sending device and receiving device clocks.

In view of the foregoing, various embodiments enable the synchronization of media playback between media devices belonging to networks exhibiting variable delays. For example, by implementing a one-way synchronization method wherein the receiving device identifies a minimum clock offset from a plurality of messages, the effects of a variable delay on clock synchronization may be reduced. Further, by continually searching for better synchronization parameters after a media stream has begun, a receiving device may improve synchronization while accounting for clock drift. Various additional advantages will be apparent in view of the foregoing.

It should be apparent from the foregoing description that various exemplary embodiments of the invention may be implemented in hardware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media. Further, as used herein, the term "processor" will be understood to encompass a microprocessor, field programmable gate array (FPGA), application-specific integrated circuit (ASIC), or any other device capable of performing the functions described herein.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method of synchronizing media playback between a sending media device and a receiving media device, the method comprising:
    receiving, at the receiving media device, a plurality of messages from the sending media device, wherein the plurality of messages comprise a plurality of sender timestamps;
    generating a plurality of clock offset values based on the plurality of sender timestamps and a clock of the receiving media device;
    identifying a minimum clock offset value from the plurality of clock offset values;
    modifying the value of the clock of the receiving media device by subtracting the minimum offset value from the value of the clock;
    locating first media data for playback and a first presentation time associated with the first media data; and
    causing the first media data to be rendered at a first time that matches the first presentation time based on the minimum clock offset, wherein the first time matching the first presentation time based on the minimum clock offset value comprises the value of the clock matching the first presentation time.

2. The method of claim 1, wherein identifying a minimum clock offset value comprises:
    generating a first clock offset value of the plurality of clock offset values;
    setting the minimum clock offset value equal to the first offset clock value;
    generating a second clock offset value of the plurality of clock offset values after setting the minimum clock offset value equal to the first offset clock value;
    determining that the second clock offset value is less than the minimum clock offset value; and
    setting the minimum clock offset value equal to the second offset clock value based on determining that the second clock offset value is less than the minimum clock offset value.

3. The method of claim 1, wherein the plurality of messages includes a first plurality of messages and a second plurality of messages, the method further comprising:
    generating a first measure of the intervals at which the first plurality of messages arrive;
    determining that the first measure of the intervals at which the first plurality of messages arrive indicates that a network is unstable;
    instructing the sending media device to transmit additional messages;
    generating a second measure of the intervals at which the second plurality of messages arrive after instructing the sending media device to transmit additional messages;
    determining that the second measure of the intervals at which the second plurality of messages arrive indicates that the network is stable,
    wherein identifying a minimum clock offset value from the plurality of clock offset values comprises utilizing at least one clock offset value of the plurality of clock offset values associated with the second plurality of messages.

4. The method of claim 1, wherein the plurality of messages includes a first plurality of messages and a second plurality of messages, the method further comprising:
    transmitting, by the sending media device, the first plurality of messages,
    generating, by the sending media device, a first measure of network performance associated with transmission of the first plurality of messages,
    determining that the first measure of network performance indicates that a network is unstable,
    transmitting, by the sending media device, the second plurality of messages based on determining that the first measure of network performance indicates that a network is unstable,
    generating, by the sending media device, a second measure of network performance associated with transmission of the second plurality of messages, and
    determining that the second measure of network performance indicates that the network is stable.

5. A receiving media device for synchronizing media playback with a sending media device, the receiving media device comprising:
    a memory configured to store media data for playback;
    a network interface configured to communicate with the sending media device; and
    a processor configured to:
        receive, via the network interface, a plurality of messages from the sending media device, wherein the plurality of messages comprise a plurality of sender timestamps;
        generate a plurality of clock offset values based on the plurality of sender timestamps and a clock of the receiving media device;
        identify a minimum clock offset value from the plurality of clock offset values;

modify the value of the clock of the receiving media device by subtracting the minimum offset value from the value of the clock;

locate first media data for playback and a first presentation time associated with the first media data; and cause the first media data to be rendered at a first time that matches the first presentation time based on the minimum clock offset value, wherein the first time that matches the first presentation time based on the minimum clock offset value comprises the value of the clock matching the first presentation time.

6. The receiving media device of claim 5, wherein, in identifying a minimum clock offset value, the processor is configured to:

generate a first clock offset value of the plurality of clock offset values;

set the minimum clock offset value equal to the first offset clock value;

generate a second clock offset value of the plurality of clock offset values after setting the minimum clock offset value equal to the first offset clock value;

determine that the second clock offset value is less than the minimum clock offset value; and set the minimum clock offset value equal to the second offset clock value based on determining that the second clock offset value is less than the minimum clock offset value.

7. The receiving media device of claim 5, wherein the plurality of messages includes a first plurality of messages and a second plurality of messages, and the processor is further configured to:

generate a first measure of the intervals at which the first plurality of messages arrive;

determine that the first measure of the intervals at which the first plurality of messages arrive indicates that a network is unstable;

instruct the sending media device to transmit additional messages;

generate a second measure of the intervals at which the second plurality of messages arrive after instructing the sending media device to transmit additional messages;

determine that the second measure of the intervals at which the second plurality of messages arrive indicates that the network is stable, wherein, in identifying a minimum clock offset value from the plurality of clock offset values, the processor is configured to utilize at least one clock offset value of the plurality of clock offset values associated with the second plurality of messages.

8. A system comprising:

a receiving media device for synchronizing media playback with a sending media device, the receiving media device comprising:

a memory configured to store media data for playback;

a network interface configured to communicate with the sending media device; and a processor configured to receive, via the network interface, a plurality of messages from the sending media device, wherein the plurality of messages includes a first plurality of messages and a second plurality of messages; and the sending media device, comprising:

a sending media device network interface configured to communicate with the receiving media device, and a sending media device processor configured to:

transmit the first plurality of messages, generate a first measure of network performance associated with transmission of the first plurality of messages, determine that the first measure of network performance indicates that a network is unstable, transmit the second plurality of messages based on determining that the first measure of network performance indicates that a network is unstable, generate a second measure of network performance associated with transmission of the second plurality of messages, and determine that the second measure of network performance indicates that the network is stable.

9. A non-transitory machine-readable storage medium encoded with instructions for execution by a receiving media device for synchronizing media playback between a sending media device and the receiving media device, the medium comprising:

instructions for receiving, at the receiving media device, a plurality of messages from the sending media device, wherein the plurality of messages comprise a plurality of sender timestamps;

instructions for generating a plurality of clock offset values based on the plurality of sender timestamps and a clock of the receiving media device;

instructions for identifying a minimum clock offset value from the plurality of clock offset values;

instructions for modifying the value of the clock of the receiving media device by subtracting the minimum offset value from the value of the clock;

instructions for locating first media data for playback and a first presentation time associated with the first media data; and instructions for causing the first media data to be rendered at a first time matches the first presentation time based on the minimum clock offset value, wherein the first time matching the first presentation time based on the minimum clock offset value comprises the value of the clock matching the first presentation time.

10. The non-transitory machine-readable storage medium of claim 9, wherein the instructions for identifying a minimum clock offset value comprise:

instructions for generating a first clock offset value of the plurality of clock offset values;

instructions for setting the minimum clock offset value equal to the first offset clock value;

instructions for generating a second clock offset value of the plurality of clock offset values after setting the minimum clock offset value equal to the first offset clock value;

instructions for determining that the second clock offset value is less than the minimum clock offset value; and instructions for setting the minimum clock offset value equal to the second offset clock value based on determining that the second clock offset value is less than the minimum clock offset value.

11. The non-transitory machine-readable storage medium of claim 9, wherein the plurality of messages includes a first plurality of messages and a second plurality of messages, the medium further comprising:

instructions for generating a first measure of the intervals at which the first plurality of messages arrive;

instructions for determining that the first measure of the intervals at which the first plurality of messages arrive indicates that a network is unstable;

instructions for instructing the sending media device to transmit additional messages;

instructions for generating a second measure of the intervals at which the second plurality of messages arrive after instructing the sending media device to transmit additional messages;

instructions for determining that the second measure of the intervals at which the second plurality of messages arrive indicates that the network is stable, wherein the instructions for identifying a minimum clock offset value from the plurality of clock offset values comprise instructions for utilizing at least one clock offset value of the plurality of clock offset values associated with the second plurality of messages.

12. A set of non-transitory machine-readable media, the set comprising:

a non-transitory machine-readable storage medium encoded with instructions for execution by a receiving media device for synchronizing media playback between a sending media device and the receiving media device, comprising instructions for receiving, at the receiving media device, a plurality of messages from the sending media device, wherein the plurality of messages includes a first plurality of messages and a second plurality of messages; and an additional non-transitory machine-readable storage medium encoded with instructions for execution by the sending media device, the additional non-transitory machine-readable storage medium comprising:

instructions for transmitting the first plurality of messages, instructions for generating a first measure of network performance associated with transmission of the first plurality of messages, instructions for determining that the first measure of network performance indicates that a network is unstable, instructions for transmitting the second plurality of messages based on determining that the first measure of network performance indicates that a network is unstable, instructions for generating a second measure of network performance associated with transmission of the second plurality of messages, and instructions for determining that the second measure of network performance indicates that the network is stable.

\* \* \* \* \*